United States Patent
Shiraishi et al.

(10) Patent No.: US 11,954,651 B2
(45) Date of Patent: Apr. 9, 2024

(54) SENSOR-BASED DIGITAL TWIN SYSTEM FOR VEHICULAR ANALYSIS

(71) Applicant: TOYOTA JIDOSHA KABUSHIKI KAISHA, Toyota (JP)

(72) Inventors: Shinichi Shiraishi, Mountain View, CA (US); Yu Zhao, Mountain View, CA (US)

( * ) Notice: Subject to any disclaimer, the term of this patent is extended or adjusted under 35 U.S.C. 154(b) by 361 days.

(21) Appl. No.: 15/925,070

(22) Filed: Mar. 19, 2018

(65) Prior Publication Data

US 2019/0287079 A1 Sep. 19, 2019

(51) Int. Cl.
G06Q 10/20 (2023.01)
G06Q 30/0601 (2023.01)
G07C 5/00 (2006.01)
G07C 5/08 (2006.01)

(52) U.S. Cl.
CPC ......... *G06Q 10/20* (2013.01); *G06Q 30/0623* (2013.01); *G06Q 30/0643* (2013.01); *G07C 5/008* (2013.01); *G07C 5/0841* (2013.01)

(58) Field of Classification Search
CPC .............. G06Q 10/20; G06Q 30/0623; G06Q 30/0643; G07C 5/008; G07C 5/0841
See application file for complete search history.

(56) References Cited

U.S. PATENT DOCUMENTS

| | | | | |
|---|---|---|---|---|
| 10,223,479 B1* | 3/2019 | Konrardy | ............... | G05B 15/02 |
| 10,599,546 B1* | 3/2020 | Walther | .................. | G06F 30/20 |
| 11,354,458 B1* | 6/2022 | Schwalb | ................ | G06N 3/006 |
| 2012/0100911 A1* | 4/2012 | Rejen | ...................... | A63F 13/57 |
| | | | | 463/31 |
| 2013/0179003 A1* | 7/2013 | Doi | ......................... | B60R 16/02 |
| | | | | 701/1 |
| 2013/0304439 A1* | 11/2013 | Van der Velden | ...... | G06F 30/20 |
| | | | | 703/6 |
| 2015/0227942 A1* | 8/2015 | Sidman | ................ | G06Q 30/018 |
| | | | | 705/317 |
| 2016/0180428 A1* | 6/2016 | Cain | ........................ | G07C 5/08 |
| | | | | 705/26.61 |
| 2016/0210383 A1* | 7/2016 | Alaniz | ..................... | G09B 9/05 |
| 2016/0210775 A1* | 7/2016 | Alaniz | .................... | G06F 30/15 |
| 2016/0253440 A1* | 9/2016 | Iyengar | .................. | G06F 30/20 |
| | | | | 703/2 |

(Continued)

OTHER PUBLICATIONS

K. Shubenkova, A. Valiev, V. Shepelev, S. Tsiulin and K. H. Reinau, "Possibility of Digital Twins Technology for Improving Efficiency of the Branded Service System", 2018, 2018 Global Smart Industry Conference (GloSIC), Chelyabinsk, Russia, pp. 1-7. (Year: 2018).*

*Primary Examiner* — Sarah M Monfeldt
*Assistant Examiner* — Michael J. Monaghan
(74) *Attorney, Agent, or Firm* — Burbage Law, P.C.; Jon-Michael Burbage

(57) ABSTRACT

The disclosure includes embodiments for modifying a performance of a vehicle component whose performance is affected by a vehicle fluid that is contaminated by water. A method according to some embodiments generating a digital twin of a vehicle. The method includes receiving digital data recorded by a sensor and describing the vehicle as it exists in a real-world. The method includes updating the digital twin of the vehicle based on the digital data describing the vehicle so that the digital twin is consistent with a condition of the vehicle as it exists in the real-world.

20 Claims, 8 Drawing Sheets

(56) References Cited

U.S. PATENT DOCUMENTS

| | | | | |
|---|---|---|---|---|
| 2016/0314224 | A1* | 10/2016 | Wei | G06F 30/20 |
| 2016/0328883 | A1* | 11/2016 | Parfenov | G06T 13/00 |
| 2017/0147990 | A1* | 5/2017 | Franke | G06Q 40/08 |
| 2017/0269681 | A1* | 9/2017 | Andersson | G09B 9/042 |
| 2017/0286570 | A1* | 10/2017 | Kim | G06F 11/3688 |
| 2017/0286572 | A1* | 10/2017 | Hershey | B64F 5/60 |
| 2018/0039249 | A1* | 2/2018 | Johnson | G05B 17/02 |
| 2018/0054376 | A1* | 2/2018 | Hershey | H04L 43/12 |
| 2018/0101775 | A1* | 4/2018 | Fish | G06Q 10/0631 |
| 2018/0107770 | A1* | 4/2018 | Cahoon | G06F 11/3684 |
| 2018/0240080 | A1* | 8/2018 | Misra | G07C 5/006 |
| 2018/0257683 | A1* | 9/2018 | Govindappa | B61L 15/0081 |
| 2018/0308379 | A1* | 10/2018 | Webb | G06F 30/15 |
| 2019/0050520 | A1* | 2/2019 | Alvarez | G06F 30/20 |
| 2019/0102494 | A1* | 4/2019 | Mars | G06F 30/20 |
| 2019/0129831 | A1* | 5/2019 | Goldberg | G06F 11/3664 |
| 2019/0138333 | A1* | 5/2019 | Deutsch | G06F 9/445 |
| 2019/0158270 | A1* | 5/2019 | Berti | H04L 9/30 |
| 2019/0258747 | A1* | 8/2019 | Milev | G06F 16/9032 |
| 2019/0266295 | A1* | 8/2019 | Masuda | G07C 5/008 |
| 2019/0325775 | A1* | 10/2019 | Kuipers | G09B 9/052 |
| 2020/0134639 | A1* | 4/2020 | Canedo | G06N 7/005 |

\* cited by examiner

SENSOR-BASED DIGITAL TWIN SYSTEM FOR VEHICULAR ANALYSIS

BACKGROUND

The specification relates to a sensor-based digital twin system for vehicular analysis. In some embodiments, the specification relates to a sensor-based digital twin system operable to provide a certification of a used vehicle.

The used vehicle market in the United States is huge. For example, in 2016 the used vehicle market in the United States was $40 billion United States Dollars (USD). A problem for end customers when buying a used vehicle is that limited information is available to accurately and meaningfully evaluate the condition of each used vehicle they consider purchasing.

SUMMARY

Described herein are embodiments of a digital twin system. In some embodiments, the digital twin system beneficially provides customers with accurate and meaningful information that they can use when determining whether to purchase a used vehicle.

In some embodiments, the digital twin system knows the state of vehicles when they are new (i.e., their "new state") based on the vehicle models for each model of one or more real-world vehicles. For example, the digital twin system is operated by a vehicle manufacturer, and so, the digital twin system has access to the vehicle models for some or all of the vehicles manufactured by the vehicle manufacturer.

In some embodiments, the digital twin system monitors a service life of a vehicle (or a fleet of vehicles) based on one or more of the following: (1) onboard data which is collected from the onboard sensors of the vehicle; and (2) measured data which is collected from sources that repair the vehicle such as dealerships, repair shops and used vehicle shops. In some embodiments, new instances of the onboard data and the measured data are repeatedly received by the digital twin system over a period of time. The state of each vehicle is updated by the digital twin system based on instances of the onboard data and the measured data that are received over the period of time, thereby enabling the digital twin system to track the mechanical condition of the vehicle and whether particular parts of the vehicles will need to be replaced in the near future based on their known state and known lifecycle [as indicated by the vehicle model for the vehicle]. In some embodiments, the digital twin system provides this service for a fleet of vehicles of various makes and models, and in this way, tracks the specific mechanical condition of specific vehicles within the fleet.

The output of updating the state of the vehicle is referred to as a "digital twin." The digital twin is a digitized version of the real-world vehicle which replicates the condition of: (1) the vehicle as a whole as indicated by the onboard data and the measured data; and (2) individual components of the vehicle as indicated by the onboard data and the measured data. The digital twin system models how the vehicle will perform in the future based on the current state of the vehicle as indicated by the digital twin for that vehicle.

In some embodiments, the digital twin system is operable to generate a report for each vehicle it tracks. The report describes, for example, one or more of the following: a mechanical condition of the vehicle; whether particular parts of the vehicle will need to be replaced in the near future; and an estimate of how the vehicle will perform if purchased.

In some embodiments, a Web Application Programming Interface (WebAPI) enables end customers to access the digital twin system and receive the report. In some embodiments, the report includes accurate and meaningful information to assist them in making a used vehicle purchase. In some embodiments, the report is accurate and meaningful because it is based on the actual sensor measurements recorded by the onboard sensors of the vehicle whose condition is described by the report, as well as mechanical inspections that were actually performed on this vehicle by independent third parties such as mechanics and technicians. The report may also optionally include a "certification" of the vehicle based on the results of the report and how the vehicle is estimated to perform in the future.

In another embodiment, the digital twin system can provide a simulation service based on (1) vehicle models and (2) digital twin models as a service over the WebAPI. By using this simulation service, end customers can virtually drive a used vehicle by using a game console, smartphone, tablet computer or some other gaming platform. The vehicle dynamics simulation and the gaming platform are connected via the Internet. Thus, end customers can virtually drive a used vehicle they are considering purchasing using the simulation service.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method including: generating a digital twin of a vehicle, receiving digital data recorded by a sensor and describing the vehicle as it exists in a real-world, and updating the digital twin of the vehicle based on the digital data describing the vehicle so that the digital twin is consistent with a condition of the vehicle as it exists in the real-world. Other embodiments of this aspect include corresponding computer systems, apparatus, and computer programs recorded on one or more computer storage devices, each configured to perform the actions of the methods.

Implementations may include one or more of the following features. The method where the digital data describes a state of one or more vehicle components of the vehicle. The method where the vehicle component is selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component. The method where the sensor is an element of the vehicle. The method where the sensor is not an element of the vehicle. The method where the vehicle is an autonomous vehicle. The method where multiple instances of the digital data are received over time as part of a feedback loop and the digital twin is recursively updated based on the digital data received in the feedback loop. The method further including generating an electronic report describing the vehicle based on the updated digital twin and providing the electronic report to an electronic device. Implementations of the described techniques may include hardware, a method or process, or computer software on a computer-accessible medium.

One general aspect includes a system including: a non-transitory memory storing digital data recorded by a sensor and describing a vehicle as it exists in a real-world; and a processor that is communicatively coupled to the non-transitory memory, where the non-transitory memory stores computer code which, when executed by the processor, causes the processor to: generate a digital twin of the vehicle; and update the digital twin of the vehicle based on the digital data describing the vehicle so that the digital twin is consistent with a condition of the vehicle as it exists in the real-world. Other embodiments of this aspect include corresponding computer systems, apparatus, and computer programs recorded on one or more computer storage devices, each configured to perform the actions of the methods.

Implementations may include one or more of the following features. The system where the digital data describes a state of one or more vehicle components of the vehicle. The system where the vehicle component is selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component. The system where the sensor is an element of the vehicle. The system where the sensor is not an element of the vehicle. The system where the vehicle is a Highly Autonomous Vehicle (HAV). The system where multiple instances of the digital data are received over time as part of a feedback loop and the digital twin is recursively updated based on the digital data received in the feedback loop. Implementations of the described techniques may include hardware, a method or process, or computer software on a computer-accessible medium.

One general aspect includes a computer program product including a non-transitory memory storing computer-executable code that, when executed by a processor, causes the processor to: generate a digital twin of a vehicle; receive digital data recorded by a sensor and describing the vehicle as it exists in a real-world; and update the digital twin of the vehicle based on the digital data describing the vehicle so that the digital twin is consistent with a condition of the vehicle as it exists in the real-world. Other embodiments of this aspect include corresponding computer systems, apparatus, and computer programs recorded on one or more computer storage devices, each configured to perform the actions of the methods.

Implementations may include one or more of the following features. The computer program product where the digital data describes a state of one or more vehicle components of the vehicle. The computer program product where the vehicle component is selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component. The computer program product where the sensor is an element of the vehicle. The computer program product where the sensor is not an element of the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
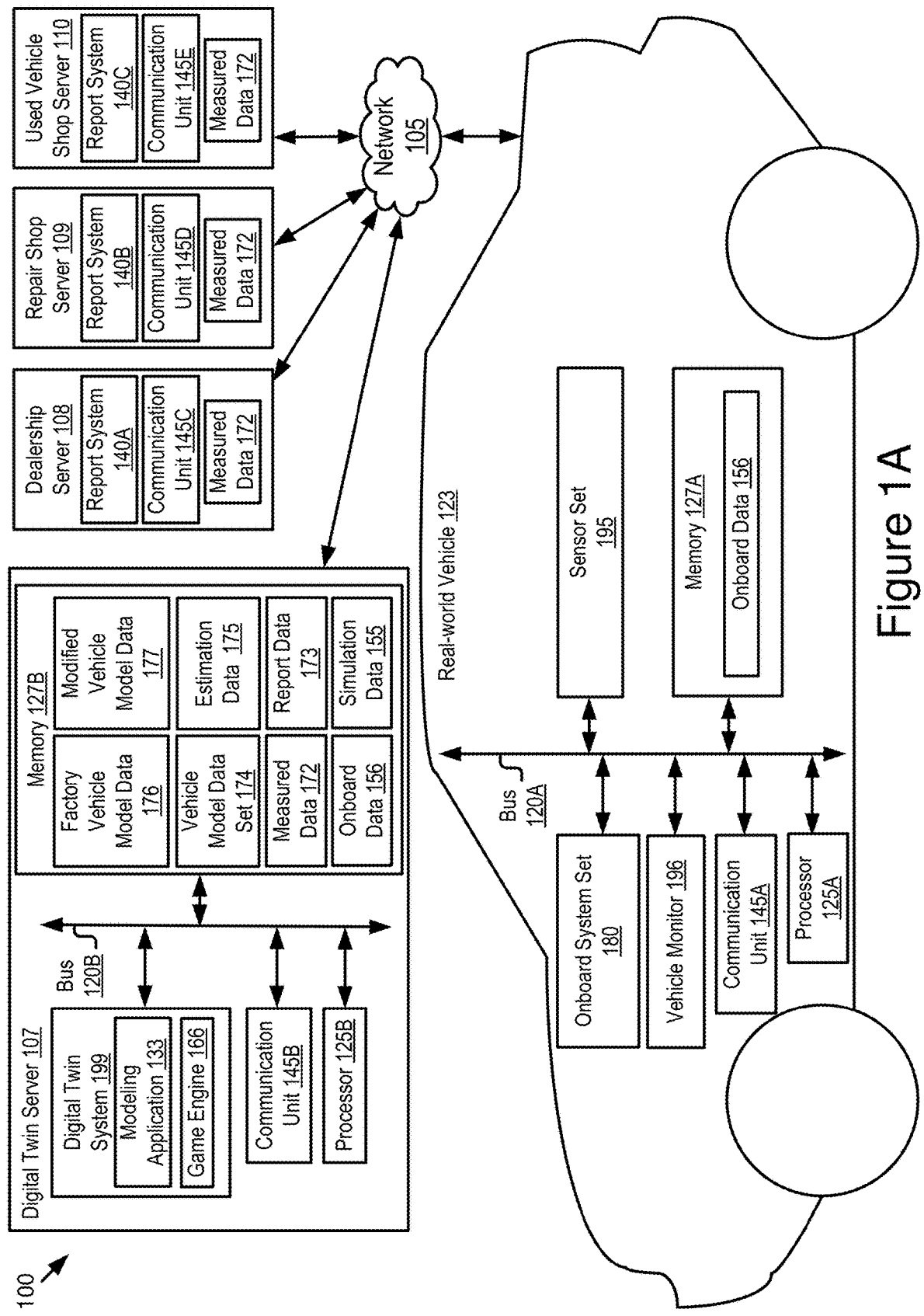
FIG. 1A is a block diagram illustrating an operating environment for a digital twin system according to some embodiments.

The used vehicle market in the United States is huge. For example, in 2016 the used vehicle market in the United States was $40 billion United States Dollars (USD). A problem for end customers when buying a used vehicle is that limited information is available to accurately and meaningfully evaluate the condition of each used vehicle they consider purchasing.

Described herein are embodiments of a digital twin system. In some embodiments, the digital twin system beneficially provides customers with accurate and meaningful information that they can use when determining whether to purchase a used vehicle.

There are three existing solutions which attempt to provide customers information to assist in making an informed decision when purchasing a used vehicle: (1) Environmental Protection Agency (EPA) stickers which are required to be placed on all used vehicles which are sold in the United States; (2) vehicle history reports which are provided by third parties; and (3) purchasing a certificated pre-owned (CPO) vehicle. Unfortunately, each of these types of information are inadequate to provide customers with accurate and meaningful information to assist them in making a used vehicle purchase. Each are discussed below.

An EPA sticker is helpful to understand the fuel efficiency of a vehicle. However, an EPA sticker only indicates the averaged performance among vehicles of the same model. Moreover, the EPA sticker itself only explains a guess about a particular vehicle's fuel efficiency and does not explain anything about the mechanical condition of a particular vehicle, whether particular parts of the vehicle will need to be replaced in the near future or how the vehicle will perform if purchased. Because of this, EPA stickers are inadequate to solve the problem solved by the digital twin system described herein according to some embodiments. By contrast, in some embodiments the digital twin system described herein informs the end customer about one or more of the following: a mechanical condition of a particular vehicle; whether particular parts of the vehicle will need to be replaced in the near future; and how the vehicle will perform if purchased.

Vehicle history reports are also inadequate to solve the problem solved by the digital twin system described herein according to some embodiments. A vehicle history report describes a history of events that happened to a used vehicle. For example, a vehicle history report includes a used vehicle's unique accident history, service records (provided the vehicle as serviced by a dealer or some other location which will provide this information to the third party that generates the vehicle history report), and whether the used vehicle has a clean title. Although vehicle history reports are helpful, it is still hard for end customers to understand the current condition of the used vehicle based on a vehicle history report. For example, a vehicle history report does not know about: (1) accidents that are not reported to the police or insurance; or (2) vehicle maintenance that is done at home or by a shop that does not share information with the third party that generates the vehicle history report. A vehicle history report also does not inform the end customer about the mechanical condition of a particular vehicle, whether particular parts of the vehicle will need to be replaced in the near future or how the vehicle will perform if purchased. Because of this, vehicle history reports are inadequate to solve the problem solved by some embodiments of the digital twin system described herein. By contrast, our invention knows about and informs the end customer about all unreported events such as: (1) accidents that are not reported to the police or insurance; and (2) vehicle maintenance that is done at home or by a shop that does not share information with the third party that generates the vehicle history report. In some embodiments, the digital twin system described herein also informs the end customer about one or more of the following: a mechanical condition of a particular vehicle; whether particular parts of the vehicle will need to be replaced in the near future; and how the vehicle will perform if purchased.

CPO vehicles are also inadequate to solve the problem solved by the digital twin system described herein according to some embodiments. For example, the mechanical CPO inspections that are required for CPO vehicles are expensive for dealers to implement because they require a manual inspection of the vehicle. They are also prone to human error and inconsistency from inspection-to-inspection because they are performed by groups of humans, and the humans included in the groups can vary from inspection-to-inspection. Moreover, the inspection itself only provides a rough picture of the vehicle's health on the day of the inspection, but not for the remaining service life of the vehicle. Because of this, CPO inspections are inadequate to solve the problem solved by the digital twin system according to some embodiments. By contrast, in some embodiments the digital twin system described herein informs the end customer about one or more of the following: a mechanical condition of a particular vehicle; whether particular parts of the vehicle will need to be replaced in the near future; and how the vehicle will perform if purchased.

In some embodiments, the digital twin system described herein overcomes the deficiencies of the existing solutions by causing a processor to execute one or more of the following steps when executed by the processor: generating a simulated version of the a vehicle in its "new state" based on vehicle model for that vehicle; aggregating onboard data and measured data that describe changes in the state of the vehicle; updating the vehicle model of the vehicle, i.e., the "digital twin," based on the onboard data and the measured data; modeling a future performance of the vehicle on a periodic or continual basis, or when requested to do so by an end customer; generating a report describing one or more of the mechanical condition of the vehicle, whether particular parts of the vehicle will need to be replaced in the near future or how the vehicle will perform if purchased; and providing the report to an end customer (e.g., using a WebAPI).

In some embodiments, the onboard data and measured data may be received on a periodic or continual basis. In some embodiments, the onboard data and measured data generally describe depreciation in the state of the vehicle, but in practice the state may periodically increase, e.g., if a new component is installed or when vehicle maintenance is performed.

In some embodiments, the vehicle model is updated on a periodic or continual basis responsive to the receipt of instances of onboard data and measured data over time.

In some embodiments, the digital twin system has access to design data. The design data is digital data that describes the vehicle models, Computer-aided Design (CAD) data, simulation/test results for each model of vehicle. Based on the design data, the digital twin system knows the state of vehicles when they are new (i.e., their "new state"). The new state of the vehicle is represented in a simulation as a digital twin of the vehicle which exists in the real-word.

In some embodiments, a vehicle includes a vehicle monitor which is executed by an electronic control unit ("ECU") of the vehicle. The vehicle includes onboard systems and onboard sensors that monitor the condition of the vehicle and its components, and track for the occurrence of significant traffic events such as traffic accidents. For example, the onboard systems of the vehicle include one or more Advanced Driver Assistance Systems (ADAS systems) which monitor for and seek to avoid traffic accidents, and generate digital data describing when such events/accidents occur. Examples of ADAS systems are described below.

Onboard Data

In some embodiments, a communication unit of the vehicle receives onboard data via the in-vehicle network which communicatively couples the communication unit to the onboard systems and the onboard sensors of the vehicle. The onboard data is digital data that includes: (1) the sensor data that describes the measurements recorded by the vehicle's onboard sensors, system status indicators and user inputs; and (2) the ADAS data that describes the events/accidents detected by the vehicle's ADAS systems as well as vehicle dynamics information measured by the ADAS systems.

Considered individually or combined, the sensor data and ADAS data describe events that appreciate or depreciate the state of the vehicle (i.e., the condition of the vehicle). For example, if a component in the vehicle is replaced for a new or upgraded version, the state of the vehicle is appreciated because the component is new or upgraded. This is detected, for example, by the ECU which controls the component and detects a new device communicating with the in-vehicle network and the ECU may generate sensor data that describes this event. If the vehicle is involved in an accident, then this depreciates the state of the vehicle and the ADAS data describes the accident.

Vehicle Monitor

In some embodiments, the vehicle monitor is software executed by an ECU of the vehicle. The vehicle monitor communicates with the communication unit of the vehicle to aggregate and timestamp the onboard data. The vehicle monitor then reports the onboard data back to the digital twin system which is stored on and executed by a server that is communicatively coupled to a wireless network. For example, the vehicle monitor causes the communication unit of the vehicle to transmit aggregated and timestamped sets of the onboard data back to the digital twin system (which operates on a cloud server) at regular intervals via Wi-Fi™, 3G, 4G, Long-term Evolution (LTE), 5G, Direct Short Range Communication (DSRC) or some other form of wireless communication. In another embodiment, the onboard data is reported back to the digital twin system when the vehicle goes to a dealership for servicing (e.g., at each oil change).

Accordingly, the onboard data is a first source of digital data for the digital twin system that describes the appreciation and depreciation of the of the vehicle.

In some embodiments, the vehicle is taken to a dealership, repair shop or used vehicle shop from time to time for servicing. In many instances, these service events are detected by the onboard systems of the vehicle and described by the onboard data. However, an optional feature according to some embodiments is the ability to capture these service events via electronic reports that are sent are sent by a report system which is provided to the dealerships, repair shops and used vehicle shops.

For example, these dealerships, repair shops and used vehicle shops include servers that are communicatively coupled to a network. Measured data is digital data that describes the service events that occur at these dealerships, repair shops and used vehicle shops. The servers include a report system. The report system is software installed in the servers of these dealerships, repair shops and used vehicle shops. The report system reports the measured data back to the digital twin system so that the measured data can be included in the analysis and functionality provided by the digital twin system.

Accordingly, the measured data is a second source of digital data for the digital twin system that describes the appreciation and depreciation of the vehicle, where the onboard data is the first source of such digital data.

The report system and the measured data are optional features of some embodiments described herein.

Digital Twin System

In some embodiments, the digital twin system includes software stored on a non-transitory memory. The non-transitory memory is an element of a processor-based computing device such as a server or cloud server. The digital twin system includes code and routines that are operable, when executed by a processor of the computing device, to cause the processor to (1) receive digital data that describes depreciation and appreciation events for a vehicle that includes a vehicle monitor and (2) generate a simulated version of the vehicle it monitors. The simulation version of the vehicle is referred to herein as a "digital twin."

In some embodiments, the digital twin system includes a game engine for generating the simulated version of the vehicle. For example, the digital twin system uses the vehicle model for a particular vehicle (based on the vehicle's particular make and model, e.g., 2017 Toyota Camry) to generate a simulated version of the particular vehicle.

In some embodiments, the digital twin system maintains a unique instance of a digital model for each particular vehicle it monitors. This unique instance is described as a "vehicle model" since it is a version of the digital model that is used to generate a simulation of a particular vehicle. In some embodiments, the digital twin system includes a simulation data set that includes the vehicle models for each of the vehicles monitored by the digital twin system.

The vehicle model includes any digital data and information that is necessary for the game engine to generate a digital twin of a real-world vehicle. In some embodiments, the vehicle model is based on design data for the real-world vehicle whose digital twin is created using the vehicle model. In some embodiments, the digital twin system includes a modeling application that is operable to generate the vehicle model for a particular vehicle based in part on the design data and, optionally, any onboard data and measured data that are received for a vehicle that is being monitored by the digital twin system.

Initially, the vehicle model is referred to as "factory vehicle model" since it represents the version of the vehicle as it was manufactured, i.e., without any depreciation. Over the life of a particular vehicle, the digital twin system receives reports of onboard data and measured data for this particular vehicle. The digital twin system modifies particular parameters of the vehicle model for this particular vehicle based on the depreciation/appreciation information included in the onboard data and the measured data.

For example, if the onboard data indicates that the vehicle now has 100,000 miles on the odometer, then the digital twin system modifies the vehicle model to reflect this depreciation for the engine, radiator, transmission, etc. for the vehicle. A vehicle model which reflects the depreciation and appreciation for a vehicle which occurs over time is referred to as the "modified vehicle model." No other vehicle model uses onboard data and measured data to generate a digital twin of a real-world vehicle which accurately reflects the mechanical condition of a used vehicle and whether particular parts of the vehicle will need to be replaced in the near future.

The modeling application includes any Modelica-based modeling application. The modeling application may include CarSim (distributed by Mechanical Simulation Corporation or Ann Arbor, Michigan), MapleSim (distributed by Maplesoft of Waterloo, Ontario) or any other Modelica-based modeling application.

The game engine may be a Unity-based game engine (such as the Unity game engine distributed by Unity Technology of San Francisco, California), or any other game engine operable, when executed by a processor, to generate a digital simulation (herein "simulation") for testing and monitoring the operation of a virtual vehicle that represents a real-world vehicle that exists in the real-world.

The modeling application includes code and routines that are operable, when executed by a processor, to generate vehicle model data that describes a vehicle model of a vehicle. The vehicle model data includes data necessary to cause the game engine to generate a virtualized version of the real-world vehicle.

In some embodiments, the factory vehicle model is described by digital data referred to as the "factory vehicle model data" and the modified vehicle model is described by digital data described as the "modified vehicle model data." See, e.g., FIG. 1A. The factory vehicle model and the modified vehicle model may be referred to herein collectively or individually as the "vehicle model."

Estimation Data

The digital twin system includes code and routines that are operable to receive the modified vehicle model data as an input and then perform hundreds or thousands of simulations which estimate one or more of the following: (1) whether particular parts of the real-world version of the vehicle will need to be replaced in the near future; and (2) how the real-world version of the vehicle will perform if purchased. Estimation data is digital data that describes an estimate of which parts of the real-world version of the vehicle will need to be replaced in the near future and how the real-world version of the vehicle will perform if purchased.

Report Data

The digital twin system provides a WebAPI to dealers and end customers (e.g., a smartphone application or a thin application for a tablet computer or some other processor-based computing device) which provides these end users with the ability to request electronic reports from the digital twin system. The report data is digital data that describes the mechanical condition of the vehicle, whether particular parts of the vehicle will need to be replaced in the near future or how the vehicle will perform if purchased. The digital twin system generates the report data based on the modified vehicle model and the estimation data for a particular real-world vehicle. For example, the real-world vehicle is a used vehicle which an end user is considering purchasing, and the report described by the report data assists them to make their purchase decision. In this way, the report described by the report data provides end customers with accurate and meaningful information that they can use when determining whether to purchase a used vehicle.

In some embodiments, the digital twin system only generates the estimation data and the report data if the server that operates the digital twin system receives a request for a report for a particular real-world vehicle. This is because the process of generating the estimation data is processor intensive, and the report data requires the estimation data to be complete.

Virtual Test Drive Service

In some embodiments, the digital twin system can provide a virtual test drive service based the modified vehicle model using the WebAPI. By using this virtual test drive service, end customers can virtually test drive a used vehicle by using a game console, smartphone, tablet computer or some other gaming platform. The vehicle dynamics simulation and the gaming platform are connected via the Internet. Thus, the digital twin system provides end customers the ability to virtually test drive a used vehicle they are considering purchasing using the simulation service.

ADAS System

Examples of an ADAS system may include one or more of the following elements of an real-world vehicle: an adaptive cruise control (ACC) system; a lane keeping assistant system (LKA); an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a real-world vehicle that makes that vehicle be an autonomous vehicle or a semi-autonomous vehicle.

In some embodiments, the ADAS system may be a vehicular system that is operable to perform or control the performance of one or more of the following vehicle functions: the steering of the vehicle; the braking of the vehicle; the acceleration of the vehicle; the operation of a transmission of the vehicle; and how aggressive or passive (e.g., fast or slow, respectively) the transmission changes one or more gears of the transmission. In this way, the ADAS system modifies the operation of an autonomous or semi-autonomous vehicle.

In some embodiments, the ADAS system may be a vehicular system that is operable to perform or control the performance of one or more of the following vehicle functions: how easily a steering wheel of the vehicle is turned by a driver of the vehicle; how much resistance the steering wheel provides to the driver when the driver attempts to turn the steering wheel; how readily a braking system of the vehicle decelerates or stops the vehicle when the driver depresses a braking pedal of the vehicle; how readily the engine of the vehicle accelerates when the driver of the vehicle depresses an accelerator of the vehicle; how aggressive or passive (e.g., fast or slow, respectively) the transmission changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. In this way, an ADAS system of the vehicle is operable to affect the performance or operation of one or more vehicle components (or their apparent performance as viewed from the perspective of the driver of the vehicle), including, for example: a power steering pump of the vehicle; a braking system of the vehicle; a fuel line of the vehicle; a fuel injector of the vehicle; a transmission of the vehicle; and an engine of the vehicle.

System Overview

Referring to FIG. 1A, depicted is an operating environment 100 for a digital twin system 199 according to some embodiments. The operating environment 100 as depicted includes a real-world vehicle 123 (herein "vehicle 123" if singular, or "vehicles 123" if plural), a digital twin server 107, a dealership server 108, a repair shop server 109 and a used vehicle shop server 110. These elements may be communicatively coupled to one another via a network 105. Although one vehicle 123, one digital twin server 107, one dealership server 108, one repair shop server 109, one used vehicle shop server 110 and one network 105 are depicted in FIG. 1A, in practice the operating environment 100 may include one or more vehicles 123, one or more digital twin servers 107, one or more dealership servers 108, one or more repair shop servers 109, one or more used vehicle shop servers 110 or one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the vehicle 123 and the digital twin server 107. The communication channel may include DSRC, LTE-V2X, full-duplex wireless communication or any other wireless communication protocol. For example, the network 105 may be used to transmit a DSRC message, a DSRC probe, a Basic Safety Message (BSM) or a full-duplex message including any of the data described herein.

The vehicle 123 is any type of connected vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an onboard system set 180. The onboard system set 180 includes a set of ADAS systems. The set of ADAS systems provide sufficient autonomous features to the vehicle 123 to render the vehicle 123 an autonomous vehicle. The National Highway Traffic Safety Administration (NHTSA) has defined different "levels" of autonomous vehicles, e.g., Level 0, Level 1, Level 2, Level 3, Level 4 and Level 5. If a vehicle 123 has a higher-level number than another vehicle 123 (e.g., Level 3 is a higher-level number than Levels 2 or 1), then the vehicle 123 with a higher-level number offers a greater combination and quantity of autonomous features relative to the vehicle 123 with the lower level number. The different levels of autonomous vehicles are described briefly below.

Level 0: The set of ADAS systems installed in the vehicle 123 have no vehicle control but may issue warnings to the driver of the vehicle 123.

Level 1: The driver must be ready to take control of the vehicle 123 at any time. The set of ADAS systems installed in the vehicle 123 may provide autonomous features such as one or more of the following: an ACC; and Parking Assistance with automated steering and LKA Type II, in any combination.

Level 2: The driver is obliged to detect objects and events in the roadway environment and respond if the set of ADAS systems installed in the vehicle 123 fail to respond properly (based on the driver's subjective judgement). The set of ADAS systems installed in the vehicle 123 executes accelerating, braking, and steering. The set of ADAS systems installed in the vehicle 123 can deactivate immediately upon takeover by the driver.

Level 3: Within known, limited environments (such as freeways), the driver can safely turn their attention away from driving tasks but must still be prepared to take control of the vehicle 123 when needed.

Level 4: The set of ADAS systems installed in the vehicle 123 can control the vehicle 123 in all but a few environments such as severe weather. The driver must enable the automated system (which is comprised of the set of ADAS systems installed in the vehicle 123) only when it is safe to do so. When the automated system is enabled, driver attention is not required for the vehicle 123 to operate safely and consistent with accepted norms.

Level 5: Other than setting the destination and starting the system, no human intervention is required. The automated system can drive to any location where it is legal to drive and make its own decision (which may vary based on the jurisdiction where the vehicle 123 is located).

In some embodiments, the vehicle 123 is a Highly Autonomous Vehicle ("HAV" if singular, or "HAVs" if plural). An HAV is a vehicle 123 (e.g., the DSRC-enabled ego vehicle) that includes a set of ADAS systems that operate at Level 3 or higher as described and above, or as defined by the NHTSA on page 9 of their policy paper entitled "Federal Automated Vehicles Policy: Accelerating the Next Revolution in Roadway Safety," which was published in September of 2016.

In some embodiments, the vehicle 123 includes one or more of the following elements: a processor 125A; a memory 127A; a communication unit 145A; an onboard system set 180; a sensor set 195; and a vehicle monitor 196. These elements of the vehicle 123 are communicatively coupled to one another via a bus 120A. Although only one of each of these elements are depicted in FIG. 1A, in practice the vehicle 123 may include one or more processors 125A, one or more memories 127A, one or more communication units 145A, one or more onboard system sets 180, one or more sensor sets 195 and one or more vehicle monitors 196.

The digital twin server 107 is a processor-based computing device. For example, the digital twin server 107 may include one or more of the following types of processor-based computing devices: a personal computer; a laptop; a mainframe; or any other processor-based computing device that is operable to function as a server. The digital twin server 107 may include a hardware server.

In some embodiments, the digital twin server 107 includes one or more of the following elements: a processor 125B; a memory 127B; a communication unit 145B; and a digital twin system 199. These elements of the digital twin server 107 are communicatively coupled to one another via a bus 120B.

The processor 125A of the vehicle 123 and the processor 125B of the digital twin server 107 may be referred to herein collectively or individually as the "processor 125" since, for example, the processor 125A of the vehicle 123 provides similar functionality to the components of the vehicle 123 as does the processor 125B of the digital twin server 107. For similar reasons, the description provided herein uses the following terms when referring to elements that are common to the vehicle 123 and the digital twin server 107: the "memory 127" when referring to the memory 127A and the memory 127B, collectively or individually; and the "communication unit 145" when referring to the communication unit 145A, the communication unit 145B, the communication unit 145C, the communication unit 145D and the communication unit 145E, collectively or individually.

The vehicle 123 and the digital twin server 107 are now described.

Vehicle 123

In some embodiments, the processor 125 and the memory 127 may be elements of an onboard vehicle computer system. The onboard vehicle computer system may be operable to cause or control the operation of one or more of the following elements: one or more ADAS systems included in the onboard system set 180; the sensor set 195; the communication unit 145; the processor 125; and the memory 127; and the vehicle monitor 196. The onboard vehicle computer system may be operable to access and execute the data stored on the memory 127 to provide the functionality described herein for the vehicle monitor 196. The onboard vehicle computer system may be operable execute the vehicle monitor 196 which causes the onboard vehicle computer system to execute one or more of the steps of the method 300 described below with reference to FIG. 3.

The onboard system set 180 includes one or more ADAS systems. The ADAS systems provide one or more autonomous features to the vehicle 123. In some embodiments, the vehicle 123 is an autonomous vehicle, a semi-autonomous vehicle, or an HAV. For example, the vehicle 123 includes a set of ADAS systems that provide autonomous features to the vehicle 123, which are sufficient to render the vehicle 123 an autonomous vehicle.

The ADAS systems may include one or more of the following elements: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

The sensor set 195 includes any onboard sensors of the vehicle 123 which monitor the roadway environment of the vehicle 123, whether internally or externally. In some embodiments, the sensor set 195 may include any sensors in the vehicle 123 that generate sensor data during a journey. In some embodiments, the sensor set 195 of the vehicle 123 may include one or more of the following vehicle sensors: a vibrometer; a collision detection system; an engine oil pressure detection sensor; a camera (e.g., one or more of an internal camera and an external camera); a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The vehicle monitor 196 incorporates the sensor data generated by these onboard sensors into the onboard data 156 stored in the memory 127.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the digital twin server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

The memory 127 of the vehicle 123 may store the onboard data 156. The onboard data 156 includes digital data that that includes: (1) sensor data that is digital data that describes the measurements recorded by the vehicle's onboard sensors which are included in the sensor set 195, system status indicators and user inputs; and (2) ADAS data that is digital data that describes the events/accidents detected by the vehicle's ADAS systems as well as vehicle dynamics information measured by the ADAS systems. In some embodiments, the onboard system set 180 includes one or more ADAS systems.

The vehicle monitor 196 includes code or routines that, when executed by the processor 125, causes the onboard data 156 to be recorded and causes the communication unit 145 to transmit the onboard data 156 to the digital twin system 199 of the digital twin server 107 via the network 105.

In some embodiments, the communication unit 145 of the vehicle 123 receives onboard data 156 via an in-vehicle network which communicatively couples the communication unit 145 to the onboard sensors and systems of the vehicle 123. The onboard data 156 is digital data that that includes: (1) sensor data that describes the measurements recorded by the onboard sensors, system status indicators and user inputs; and (2) ADAS data that describes the events/accidents detected by the ADAS systems as well as vehicle dynamics information measured by the ADAS systems. The vehicle monitor includes code and routines that are operable, when executed by the processor 125 of the vehicle 123, causes the processor 125 to execute one or more of the following steps: (1) communicate with the communication unit 145 of the vehicle 123 to receive the onboard data 156; (2) aggregate and timestamp the onboard data 156; and (3) report the onboard data 156 to the digital twin system 199 via the network 105.

The vehicle monitor 196 includes code and routines that are operable to collect the onboard data 156, store the onboard data 156 in the memory 127 and cause the communication unit 145 of the vehicle 123 transmit the onboard data 156 to the digital twin server 107.

In some embodiments, the vehicle monitor 196 of the vehicle 123 may be implemented using hardware including a field-programmable gate array ("FPGA") or an application-specific integrated circuit ("ASIC"). In some other embodiments, the vehicle monitor 196 may be implemented using a combination of hardware and software.

The vehicle monitor 196 is described in more detail below with reference to FIGS. 1B, 1C, 2 and 3.

Digital Twin Server 107

In some embodiments, the digital twin server 107 is a cloud server that includes one or more of the following elements: a digital twin system 199; a processor 125; a memory 127; and a communication unit 145. These elements are communicatively coupled to one another via the bus 120B. The following elements of the digital twin server 107 are the same or similar to those described above for the vehicle 123, and so, the descriptions of these elements will not be repeated here: the processor 125; the memory 127; and the communication unit 145.

The memory 127 of the digital twin server 107 stores one or more of the following elements: vehicle model data set 174; factory vehicle model data 176; measured data 172; onboard data 156; modified vehicle model data 177; estimation data 175; simulation data 155; and report data 173.

The vehicle model data set 174 includes digital data that describes one or more vehicle models for one or more real-world vehicles such as the vehicle 123. For example, the vehicle model data set 174 includes a set of instances of vehicle model data 184 (see, e.g., FIGS. 1B and 1C) that describe a set of different vehicle models. In some embodiments, the vehicle model data set 174 includes an instance of vehicle model data 184 for each make and model of vehicle offered by a particular vehicle manufacturer (e.g., Toyota). In this way the vehicle model data set 174 includes a plurality of different vehicle models.

In some embodiments, the vehicle model data 184 includes digital data that describes design information for the vehicle 123 and its individual vehicle components. For example, the design information includes Computer-Aided Design (CAD) data from an Original Equipment Manufacturer (OEM) of the vehicle 123 or its individual vehicle components.

In some embodiments, the vehicle model data set 174 is indexed based on make and model so that the digital data that describes particular factory vehicle models are retrievable from the vehicle model data set 174 by querying the vehicle model data set 174 by specifying a particular a make and model of a particular vehicle 123. For example, the digital twin system 199 initiates monitoring of a particular real-world vehicle such as the vehicle 123 (e.g., when the vehicle is sold by a dealer or its manufacture is completed). The digital twin system 199 receives digital data describing the make and model of the vehicle 123. In some embodiments, the make and model of a particular vehicle 123 are identifiable based on the vehicle identification number (VIN) for the particular vehicle 123. The digital twin system 199 queries the vehicle model data set 174 using the make and model information of the vehicle 123 to identify, from the vehicle model data set 174, the particular vehicle model data 184 for this particular vehicle 123.

Figure 1B:
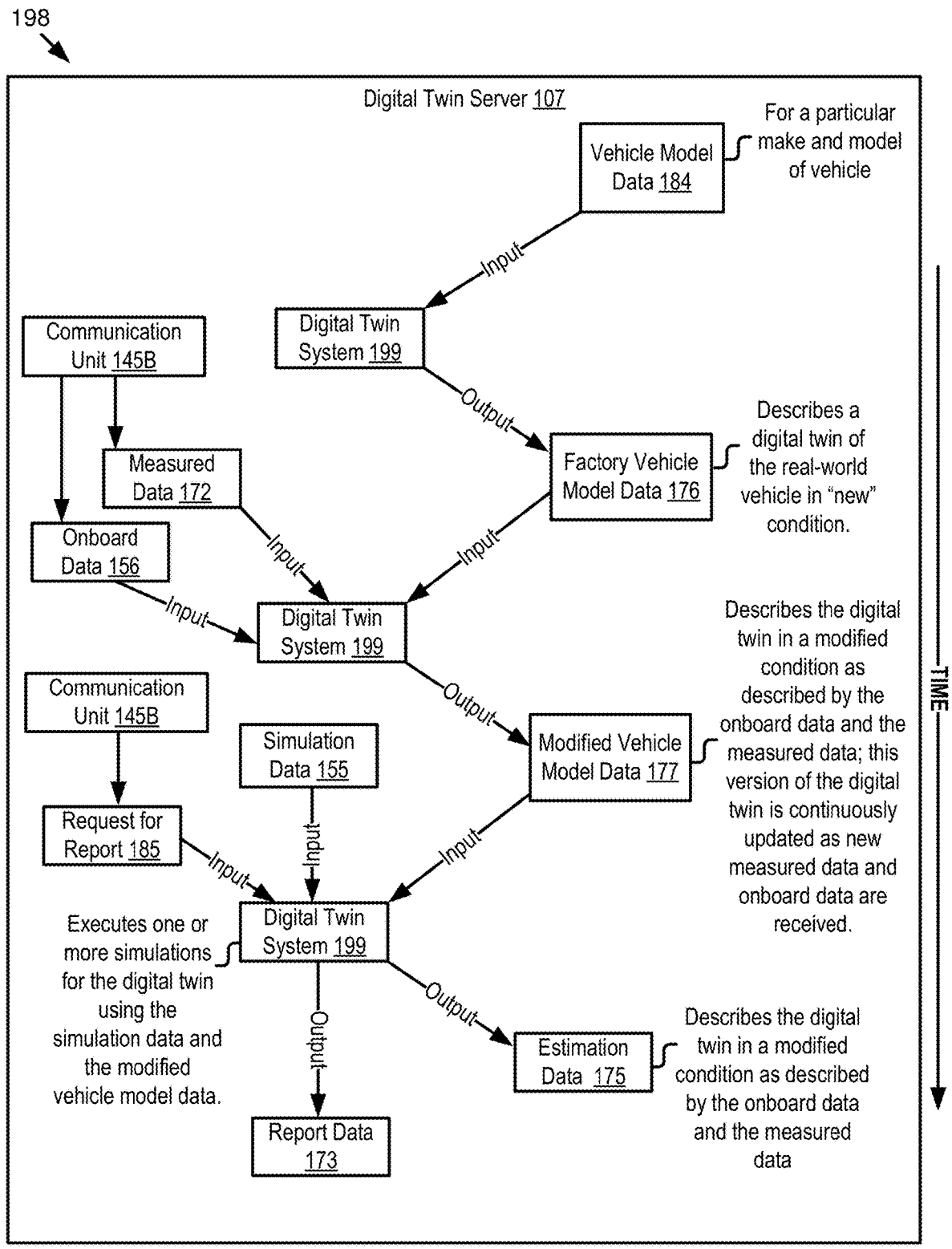
FIG. 1B is a block diagram illustrating a process flow for a digital twin system to provide report data according to some embodiments.
Figure 1C:
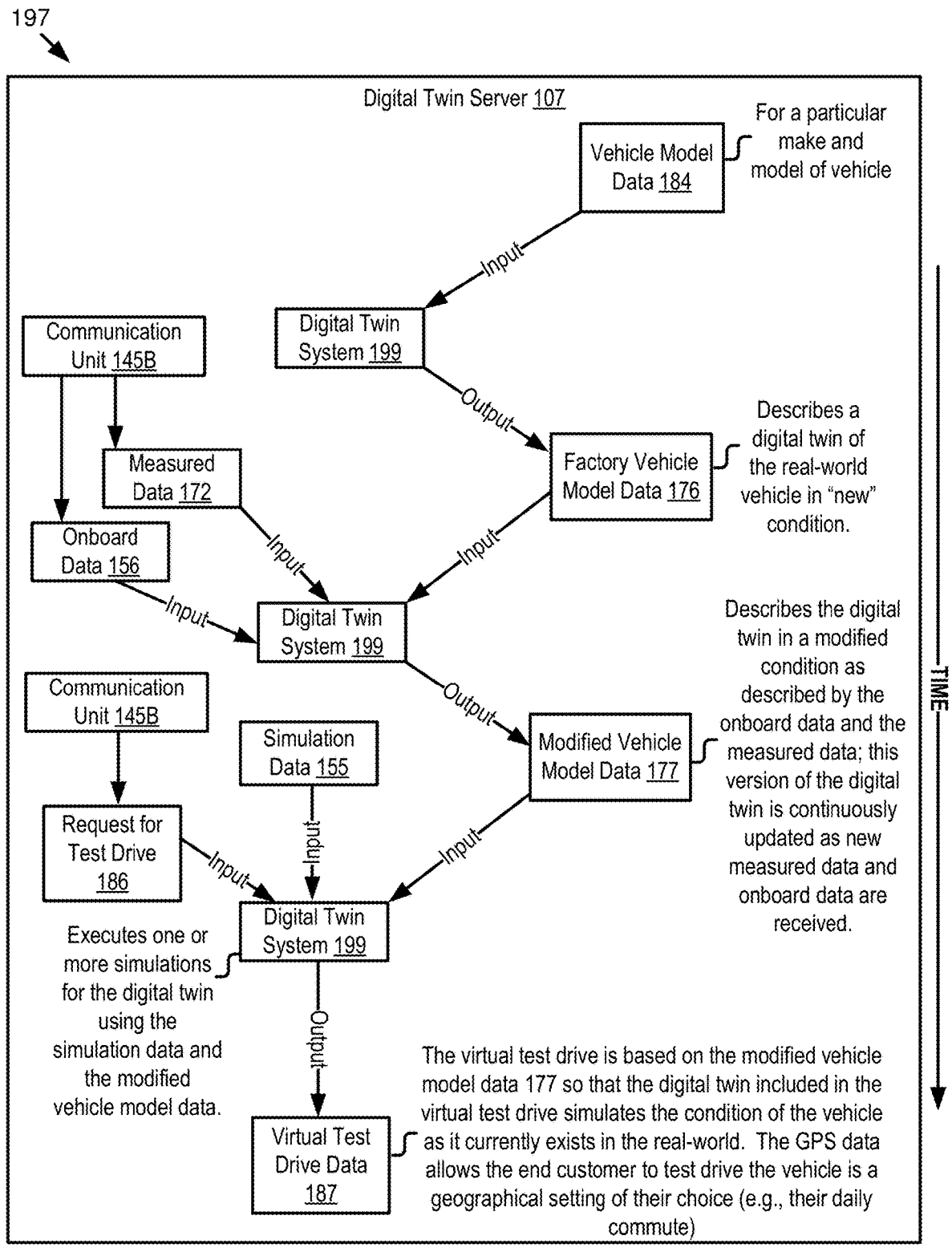
FIG. 1C is a block diagram illustrating a process flow for a digital twin system to provide a virtual test drive according to some embodiments.

The digital twin system 199 generates an instance of factory vehicle model data 176 for this particular vehicle 123 based on the vehicle model data that is associated with the VIN for this particular vehicle 123. The vehicle model data describes the design of the particular vehicle 123 associated with the VIN, whereas the factory vehicle model data 176 includes all the digital data necessary to cause the game engine 166 to generate a virtual version of the particular vehicle 123 associated with the VIN. In some embodiments, the vehicle model data describes the hardware and software design of the vehicle 123. An example of the vehicle model data is depicted in FIGS. 1B and 1C. See, e.g., the vehicle model data 184 depicted in FIGS. 1B and 1C.

Referring to FIG. 1A, the preceding paragraph describes the digital twin system 199 generating a factory vehicle model for a particular vehicle 123 that is described by an instance of factory vehicle model data 176 for the particular vehicle 123. The digital twin system 199 separately stores the instance of the factory vehicle model data 176 in the memory 127 of the digital twin server 107; although the vehicle model data may be re-used repeatedly for other vehicles having the same make and model as this particular vehicle 123, this separately stored instance of factory vehicle model data 176 is reserved for this particular vehicle 123 and will be revised by the digital twin system 199 as instances of onboard data 156 and measured data 172 are received over time.

For example, the digital twin system 199 monitors for onboard data 156 and measured data 172 that are received by the digital twin server 107 and associated with the VIN for this particular vehicle 123; the digital twin system 199 updates the factory vehicle model data 176 based on the onboard data 156 and the measured data 172 to reflect the depreciation or appreciation described by one or more of the onboard data 156 and the measured data 172, and in this way outputs the modified vehicle model data 177 for this particular vehicle 123. This modified vehicle model data 177 is operable to generate a digital twin of this particular vehicle 123 that accurately reflects the state of this particular vehicle 123 because it is generated based on the onboard data 156 recorded by this particular vehicle 123 and the measured data 172 for this particular vehicle. The digital twin system 199 continues to monitor for onboard data 156 and measured data 172 that are received by the digital twin server 107 and associated with the VIN for this particular vehicle 123; the digital twin system 199 updates the modified vehicle model data 177 based on the onboard data 156 and the measured data 172 to reflect further depreciation or appreciation described by the onboard data 156 and the measured data 172, and in this way the digital twin system 199 continuously updates a digital twin for a particular vehicle 123.

The factory vehicle model data 176 includes all the digital data necessary to cause the game engine 166 to generate a virtual version of a particular vehicle 123 (i.e., a digital twin of the particular vehicle 123) in a simulation provided by the game engine 166. The digital twin generated based on the factory vehicle model data 176 represents the particular vehicle 123 as manufactured. In other words, the digital twin generated based on the factory vehicle model data 176 represents a vehicle 123 that is not depreciated or appreciated, and is otherwise unaltered from its condition when manufactured.

The onboard data 156 is described above with reference to the vehicle 123, and so, that description will not be repeated here. The onboard data 156 is received by the communication unit 145 of the digital twin server 107 from the network 105. The communication unit 145 of the digital twin server 107 provides the onboard data to the digital twin system 199. The onboard data 156 includes digital data that uniquely identifies the particular vehicle 123 that recorded and transmitted the onboard data 156 (e.g., a VIN). The digital twin system 199 stores the onboard data 156 in the memory 127 of the digital twin server 107 in a way that indicates that this particular instance of onboard data 156 is associated with the particular vehicle 123 indicated by the VIN. In this way, the digital twin system 199 is able to accurately update the vehicle model for this particular vehicle 123 based on the onboard data 156. As used here, "the vehicle model for this particular vehicle 123" means the factory vehicle model data 176 for this particular vehicle 123 if no modified vehicle model data 177 exists for this particular vehicle 123, or the modified vehicle model data 177 for this particular vehicle 123 if one exists in the memory 127 of the digital twin server 107.

The measured data 172 includes digital data that describes a service event for a particular vehicle 123. In some embodiments, the measured data 172 includes the VIN for the particular vehicle 123 or some other digital data that uniquely identifies the particular vehicle 123 that received the service event. A service event is an event when the vehicle 123 is taken to a dealership, repair shop or used vehicle shop for servicing. The report system 140A, 140B, 140C is software installed in the servers 108, 109, 110 of these dealerships, repair shops and used vehicle shops. The report system reports the measured data 172 to the digital twin system 199 via the network 105 so that the measured data 172 can be included analysis and other functionality provided by the digital twin system 199. For example, the report system 140 causes the communication unit 145 of these servers 108, 109, 110 to report the measured data 172 back to the digital twin system 199 via the network 105.

The modified vehicle model data 177 includes digital data that describes a modified vehicle model for a particular vehicle 123. The modified vehicle model data 177 includes all the digital data necessary to cause the game engine 166 to generate a virtual version of the particular vehicle 123 (i.e., a digital twin of the particular vehicle 123) in a simulation provided by the game engine 166. The digital twin generated based on the modified vehicle model data 177 represents the particular vehicle 123 in a state that is different than its state as manufactured. In other words, the digital twin represents the particular vehicle 123 in a modified state that is accurate relative to the actual condition of the particular vehicle 123 in the real-world. The modified state of the vehicle 123 may include depreciation, appreciation or a combination of depreciation and appreciation (e.g., some components of the vehicle 123 are depreciated, while other components of the vehicle 123 are appreciated).

The digital twin system 199 includes code and routines that are operable to receive the modified vehicle model data 177 for a particular vehicle 123 as an input, as well as simulation data 155 that describes one or more virtual roadway environments (e.g., a road surface and other features of the road surface) as well as one or more static and dynamic objects included in the virtual roadway environments (e.g., traffic signs, traffic lights, pedestrians, pot holes, animals, other vehicles, etc.) and then perform hundreds or thousands of simulations which estimate one or more of the following: (1) whether particular parts of the real-world version of the particular vehicle 123 will need to be replaced in the near future; and (2) how the real-world version of the particular vehicle 123 will perform if purchased. The estimation data 175 includes digital data that describes one or more of the following: (1) an estimate of which parts of the real-world version of the particular vehicle 123 will need to be replaced in the near future; and (2) an estimate of how the real-world version of the particular vehicle 123 will perform if purchased. The estimates described by the estimation data 175 are based on the simulations performed by the digital twin system 199 for the particular vehicle using the modified vehicle model data 177 for this particular vehicle 123.

The report data 173 includes digital data that describes an electronic report that describes the mechanical condition of the specific vehicle 123, whether particular parts of the vehicle 123 will need to be replaced in the near future or how the vehicle 123 will perform if purchased. The report data 173 is generated by the digital twin system 199 based on the estimation data 175. The digital twin system 199 includes code and routines that are operable, when executed by the processor 125 of the digital twin server 107, to cause the processor 125 to generate the report data 173 based on the modified vehicle model data 177 and the estimation data 175 for the particular vehicle 123. For example, the particular vehicle 123 is a used vehicle which an end user is considering for purchase, and the report described by the report data 173 assists the end user to make their purchase decision.

The simulation data 155 includes all the digital data necessary to create static and dynamic objects in one or more simulations provided by the game engine 166. The simulation data 155 may be operable to cause the static and dynamic objects included in the one or more simulations to have realistic behavior and realistic physical properties. The one or more simulations include the digital twin of the particular vehicle 123. The simulation data 155 may be generated by the game engine 166 based at least in part on modified vehicle model data 177 which is modified based on the onboard data 156 and the measured data 172 so that the modified vehicle model described by the modified vehicle model data 177 accurately reflects the current state of the particular vehicle 123 that is described by the onboard data 156 and the measured data 172.

In some embodiments, the estimation data 175 is digital data describing the performance of the digital twin while operating in the simulation provided by the game engine 166. For example, the estimation data 175 describes how discrete virtualized vehicle components included in the digital twin performed under certain situations presented to the digital twin during the simulation. The estimation data 175 may be generated by the game engine 166 based on the operation of the digital twin during the course of one or more simulations provided by the game engine 166 based on the simulation data 155. In some embodiments, the estimation data 175 describes the current state of each component of the vehicle 123 relative to the expected service life for each component of the vehicle 123 as indicated by the vehicle model for this particular vehicle 123. The vehicle model for this particular vehicle is described by the vehicle model data (e.g., the vehicle model data 184 depicted in FIGS. 1B and 1C) for this particular vehicle 123.

The digital twin system 199 includes one or more of the following elements: a modeling application 133; and a game engine 166.

In some embodiments, the modeling application 133 includes code and routines that are operable, when executed by the processor 125 of the digital twin server 107, to generate a vehicle model. In some embodiments, the vehicle model that describes the hardware and software design of the vehicle 123 in its factory condition, which may be collectively referred to as a "vehicle design" for the vehicle 123. In some embodiments, the vehicle model is described by the vehicle model data (see, e.g., the vehicle model data 184 depicted in FIGS. 1B and 1C). In other words, the modeling application generates the vehicle model data 184 based on the vehicle design for the vehicle. The modeling application 133 receives the vehicle model data 184 and generates the factory vehicle model data 176 based on the vehicle model data 184. The modeling application 133 may generate and modify the factory vehicle model data 176 based on one or more instances of onboard data 156 and measured data 172 that are received from a particular vehicle 123, and thereby generate the modified vehicle model data 177 based on the factory vehicle model data 176 and one or more of the following: one or more instances of onboard data 156; and one or more instances of measured data 172.

In some embodiments, additional instances of onboard data 156 and/or measured data 172 are received by the digital twin system 199 for this particular vehicle 123. The modeling application 133 modifies the modified vehicle model data 177 based on one or more instances of onboard data 156 and measured data 172 that are received from a particular vehicle 123, and thereby generate a second version of the modified vehicle model data 177 based on the prior version of the modified vehicle model data 177 and the additional instances of one or more of the following: one or more additional instances of onboard data 156; and one or more additional instances of measured data 172. In some embodiments, additional versions of the modified vehicle model data 177 (e.g., a third version, a fourth version, a fifth version, etc.) are generated by the digital twin system 199 as additional instances of onboard data 156 and measured data 172 are received for this particular vehicle 123.

Initially, the factory vehicle model data 176 may be based on the vehicle design of the vehicle 123 described by the vehicle model data 184 without any depreciation events or appreciation events. The vehicle model data 184 may be retrieved from the vehicle model data set 174 or inputted as one or more files updated to the digital twin system 199 by a vehicle design engineer or some other administrator of the digital twin server 107. However, over time depreciation and appreciation events occur (e.g., the vehicle 123 is driven and accrues mileage, the vehicle 123 is involved in a collision, the oil for the vehicle 123 is changed, the brake pads for the vehicle 123 are changed, other wear-and-tear events, etc.) the modeling application 133 generates the modified vehicle model data 177 based on the onboard data 156 and any measured data 172 received from the network 105. In this way, the vehicle model described by the factory vehicle model data 176 is modified by the modeling application 133 to generate the modified vehicle model data 177 which accurately reflects the current state of the vehicle 123 in the real-world as described by the onboard data 156 and the measured data 172.

In some embodiments the digital twin system 199 includes one or more modeling applications 133. Different modeling applications 133 may be specialized for generating or modifying particular types of digital models (herein "models") which are included in the vehicle design described by the factory vehicle model data 176 or the modified vehicle model data 177. For example, the digital twin system 199 may include one or more of the following modeling applications: Dymola (produced by Dassault Systemes AB, Lund of Velizy-Villacoublay, France, and used to generate a vehicle model); MapleSim (produced by Maplesoft of Waterloo, Ontario, and used to generate a vehicle model); Simulink (produced by MathWorks of Natick, Massachusetts, and used to generate models of a the one or more ADAS systems of the vehicle); and PreScan (produced by TASS International of the Netherlands, and used to generate models of a the one or more ADAS systems of the vehicle), etc.

The modeling application 133 may also generate other models used by the game engine 166. For example, the modeling application 133 may generate a model describing a virtual roadway environment for inclusion in the simulation provided by the game engine 166. The modeling application 133 may also generate a model describing virtual and static objects which are included in the simulation provided by the game engine 166.

The game engine 166 may include code and routines that are operable, when executed by the processor of the digital twin server 107, to generate a simulation based on the one or more models generated by the one or more modeling applications 133. The game engine 166 may also include software for generating the vehicle roadway model based on inputs provided by a human administrator of the digital twin server 107 or other data uploaded to the digital twin server 107 (e.g., via the network 105 or some other data uploaded to the digital twin server 107 such as via a memory card or some other non-transitory memory). An example of the game engine 166 may include the Unity game engine (produced by Unity Technologies of San Francisco, California) or some other game engine.

One or more of the game engine 166 and the modeling application 133 may generate the one or more models that describe the one or more dynamic objects and the behavior of these dynamic objects.

The game engine 166 may include software that is operable, when executed by the processor of the digital twin server 107, to generate the simulation data 155. The game engine 166 may generate the simulation data 155 based on the modified vehicle model data 177 and other digital data that describes the different models discussed above. The simulation data 155 and the game engine 166, when executed by the processor 125, may cause the processor 125 to generate one or more simulations for testing the operation of a virtual vehicle which accurately represents the operation of vehicle 123 based on its current state as described by the onboard data 156 and the measured data 172 since the modeling application 133 has modified the factory vehicle model data 176 based on the onboard data 156 and the measured data 172 to generate the modified vehicle model data 177.

In some embodiments, the game engine 166 runs one or more simulations to test and evaluate the performance of the digital twin built based on the modified vehicle model data 177 in the one or more simulations. The game engine 166 generates the one or more simulations using the simulation data 155. The simulation data 155 is determined by the game engine 166 using the latest version of the modified vehicle model data 177. In this way, the simulation data 155 enables the game engine 166 to generate the one or more simulations which test the operation of the digital twin with accurately represents the operation of real-world vehicle 123 based on its current state as described by the onboard data 156 and the measured data 172. In other words, the digital twin, when simulated by the game engine 166, accurately simulates the performance of the vehicle 123 while experiencing the modified performance caused by the depreciation events and appreciation events described by the onboard data 156 and the measured data 172. As the one or more simulations are running, the game engine 166 generates the estimation data 175, which describes the performance of the digital twin while operating in the one or more simulations relative to the design specification for the vehicle 123.

The design specification for the vehicle 123 includes digital data that describes the vehicle design for the vehicle 123 and how its discrete vehicle components operate when their operation conforms to the vehicle design, as well as the expected service life for each of these vehicle components and how these vehicle components perform at different points in their service life (which can then be used to estimate the current state of each vehicle component based on analysis of the one or more simulations performed by the game engine 166). The specifications for the one or more vehicle components describes the design of these vehicle components and how they should operate when included in the vehicle design. In some embodiments, the specification for the vehicle 123 or the specifications for the one or more vehicle components describe a level of performance that the vehicle components of the vehicle 123 should provide for the vehicle 123 in order for the vehicle 123 to operate in accordance with its design.

In some embodiments, the digital twin system 199 includes code and routines that are operable, when executed by the processor 125 of the digital twin server 107, to cause the processor 125 to generate the report data 173 based on the estimation data 175 and cause the communication unit 145 of the digital twin server 107 to transmit the report data 173 to the network 105. A computing device operated by an end user (e.g., a smartphone, a laptop, etc.) then receives the report data 173 from the network 105 and provide the report described by the report data 173 to the end user via an electronic display.

Examples of modeling applications 133 and game engines 166 used in some of the embodiments described herein are described in U.S. patent application Ser. No. 15/135,135 filed on Apr. 21, 2016 and entitled "Wind Simulation Device," the entirety of which is hereby incorporated by reference. See, for example, the "virtual simulation tool" described in U.S. patent application Ser. No. 15/135,135. Embodiments of this technology are also discussed in U.S. patent application Ser. No. 15/074,842 filed on Mar. 18, 2016 and entitled "Vehicle Simulation Device for Crowd-Sourced Vehicle Simulation Data," the entirety of which is hereby incorporated by reference. Embodiments of this technology are also discussed in U.S. patent application Ser. No. 15/085,644 filed on Mar. 30, 2016 and entitled "Dynamic Virtual Object Generation for Testing Autonomous Vehicles in Simulated Driving Scenarios," the entirety of which is hereby incorporated by reference. One or more of the digital twin system 199 and the vehicle monitor 196 described herein may be modified to include any of the elements described in U.S. patent application Ser. Nos. 15/135,135, 15/085,644 and 15/074,842.

In some embodiments, the digital twin system 199 of the digital twin server 107 may be implemented using hardware including a FPGA or an ASIC. In some other embodiments, the digital twin system 199 may be implemented using a combination of hardware and software. The digital twin system 199 may be stored in a combination of the devices (e.g., servers or other devices). The digital twin system 199 is described in more detail below with reference to FIGS. 1B, 1C and 2-6.

The dealership server 108 is a hardware server similar to the digital twin server 107. The dealership server 108 is operated by a vehicle dealership. The dealership server 108 includes a report system 140 that collects measured data 172 as measured by the technicians and personnel of the dealership when servicing the vehicle 123. For example, the report system 140 causes an electronic display (e.g., a computer monitor) to display a graphical user interface depicting an electronic form and a technician inputs information about the vehicle 123 into the electronic form, and this information is described by the measured data 172. The communication unit 145 of the dealership server 108 provides the measured data 172 recorded at the dealership to the network 105, and the communication unit 145 of the digital twin server 107 receives the measured data 172 from the network 105 and takes steps that cause the measured data 172 to be stored in the memory 127 of the digital twin server 107.

The repair shop server 109 is a hardware server similar to the digital twin server 107. The repair shop server 109 is operated by a repair shop. The repair shop server 109 includes a report system 140 that collects measured data 172 as measured by the technicians and personnel of the repair shop when servicing the vehicle 123. The communication unit 145 of the repair shop server 109 provides the measured data 172 recorded at the repair shop to the network 105, and the communication unit 145 of the digital twin server 107 receives the measured data 172 from the network 105 and takes steps that cause the measured data 172 to be stored in the memory 127 of the digital twin server 107.

The used vehicle shop server 110 is a hardware server similar to the digital twin server 107. The used vehicle shop server 110 is operated by a used vehicle shop. The used vehicle shop server 110 includes a report system 140 that collects measured data 172 as measured by the technicians and personnel of the used vehicle shop when servicing the vehicle 123. The communication unit 145 of the used vehicle shop server 110 provides the measured data 172 recorded at the used vehicle shop to the network 105, and the communication unit 145 of the digital twin server 107 receives the measured data 172 from the network 105 and takes steps that cause the measured data 172 to be stored in the memory 127 of the digital twin server 107.

A used car shop (sometimes called a used car lot) is differentiated from a dealership because a used vehicle shop is not an official dealer for a particular vehicle manufacturer, and as such, the measured data 172 it provides is less reliable and may be given less weight by the digital twin system 199 when generating the modified vehicle model data 177. Similarly, the measured data 172 provided by the dealership server 108 may also be given greater weight than the measured data 172 provided by the repair shop server 109.

In some embodiments, one or more of the onboard data 156 and the measured data 172 describes a vehicle component of the vehicle 123. For example, the vehicle 123 a set of components and one or more of the onboard data 156 and the measured data 172 describes a state or condition of one or more of these vehicle components. The vehicle 123 may include sensors that are operable to measure the information about these vehicle components which is described by the onboard data 156 or the measured data 172. Optionally, for measured data 172, a technician or some other user may use a hand-held sensor that measures the information about these vehicle components.

In some embodiments, example vehicle components include one or more of the following: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; a powertrain component; and a belt. For example, a vehicle component is damaged, replaced or otherwise depreciated or appreciated, and one or more of the measured data 172 and the onboard data 156 describe this event and a quantity for the depreciation or the appreciation for the vehicle component.

In some embodiments, examples of depreciation or appreciation of the vehicle 123 include one or more of the following: an engine is repaired; an engine is damaged; a brake line is cut; a brake line is patched or reinstalled; a fuel injector is clogged; a fuel injector has exceeded its lifespan and is now malfunctioning; a fuel injector is cleaned; a fuel injector is repaired or replaced; a power steering unit is worn out; a power steering unit is replaced; a power steering unit has its power steering fluid replaced or topped off; a transmission is slipping or otherwise malfunctioning; a transmission is replaced, repaired or has its transmission fluid replaced; a tire is inflated below or above its recommended air pressure; the tread of a tire is worn down below its recommended level; a tire has not been rotated within its recommended cycle for rotating tires; a tire is inflated to its recommended tire pressure; a tire is replaced; a tire is rotated; a filter is clogged; a filter is used for its recommended term or past its recommended term; a filter is replaced; a filter is cleaned; a vehicle fluid is contaminated or otherwise rendered defective; a vehicle fluid is replaced or topped off; a brake pad is worn; a brake pad is replaced; a brake rotor is scratched or damaged; a brake rotor is replaced or resurfaced; a sensor is dirty, damaged or otherwise malfunctioning or not providing sensor data; a sensor is cleaned, re-wired, replaced or its driver is updated; a sensor's fuse is replaced; an onboard vehicle computer is malfunctioning or not responding; an onboard vehicle computer is replaced, rewired or updated; a windshield is cracked, chipped or otherwise damaged; a windshield is repaired or replaced; a battery fluid is low, a battery's terminals are dirty, a battery will not hold a charge; a battery's wires or wire insulation is frayed, cut or otherwise defective; a battery's fluid (e.g., water) is replaced or topped off; a battery's terminal's are cleaned; a battery's wires or replaced or repaired; a windshield wiper is used past its useful life; a windshield wiper is replaced or its cleaning blade is replaced; an alternator is shorted, used past its useful life or otherwise not outputting enough current to maintain a battery's charge; an alternator is replaced, an alternator's belt is replaced or tightened; a spark plug is malfunctioning, a spark plug is replaced or re-gapped; a sparkplug wire is shorted or damaged; a sparkplug wire is replaced; a distributor cap has a short or is otherwise malfunctioning; a distributor cap is replaced; a vehicle body panel is dented, bent, warped, scratched, has damaged or undesirable paint or is otherwise damaged or undesirable; the vehicle body panel is repaired, replaced or repainted; a infotainment system component is damaged or malfunctioning; the infotainment system component is replaced; a powertrain component is malfunctioning; a powertrain component is repaired or replaced; a belt is worn or loose; a belt is tightened or replaced; etc. These examples are intended to be illustrative and not limiting.

Examples of vehicle components being measured are described in U.S. patent application Ser. No. 15/363,368 filed on Nov. 29, 2016 and entitled "Optimization of a Vehicle to Compensate for Water Contamination of a Fluid of a Vehicle Component," the entirety of which is hereby incorporated by reference.

In some embodiments, the digital twin system 199 includes code and routines that are operable, when executed by the processor 125 of the digital twin server 107, to provide advanced vehicle condition analytics services to the used vehicle market, i.e., individual used vehicle shops, or enterprises of used vehicle trading. These companies can use the provided information as a certification of a used vehicle (e.g., the vehicle 123). In some embodiments, the digital twin system 199 integrates both (1) design information, e.g., CAD data from an OEM and (2) live data from connected cars such as the vehicle 123, so that the analytics provided by the digital twin system 199 (e.g., the estimation data 175 that is included in the electronic report described by the report data 173) precisely reflects the current condition of the used vehicle (e.g., engine performance, battery condition, etc.). In other words, the digital twin used in the simulations is consistent with the current condition of the used vehicle. In some embodiments, the estimation data 175 includes estimations of a remaining lifespan of the vehicle 123 or its discrete vehicle components, or estimations of when discrete vehicle components will need to be replaced.

Existing solutions only provide end customers with information about the gas mileage of a used vehicle, crash reports/maintenance reports for a used vehicle and used vehicle certifications which are prone to human error and inconsistency. The crash reports/maintenance reports and used vehicle certifications do not estimations of a remaining lifespan of the vehicle 123 or its discrete vehicle components, or estimations of when discrete vehicle components will need to be replaced; instead, these crash reports/maintenance reports and used vehicle certifications simply describe snapshots of the vehicle as it was in the past (e.g., crash reports/maintenance reports) and the present (e.g., used vehicle certifications). By comparison, the digital twin system 199 described herein provides an independent third-party service that provides end customers with one or more of the following: (1) an electronic report that describes the mechanical condition of a particular vehicle 123, whether discrete vehicle components of the vehicle 123 will need to be replaced in the near future and/or how the vehicle 123 will perform if purchased; (2) a simulation service which provides customers with a virtual test drive of the actual vehicle 123 they are considering purchasing in its current mechanical condition and in a geographic setting of the customer's choice; and (3) a certification of the vehicle 123 if it is estimated to perform well in the future by the digital twin system 199.

Referring now to FIG. 1B, depicted is a block diagram illustrating a process flow 198 for the digital twin system 199 to provide report data 173 according to some embodiments.

In some embodiments, the process flow 198 depicts an example of how the digital twin system 199 generates report data 173 for a particular vehicle 123. The VIN number or some other unique identifier is specified in the request 185 received by the communication unit 145 of the digital twin server 199. The digital twin system 199 then retrieves the correct report data 173 based on this unique identifier. The communication unit 145 of the digital twin server 199 then transmits an electronic message including the report data 173 to the end customer's electronic device (e.g., smartphone).

In some embodiments, the digital twin system 199 executes one or more simulations for the digital twin described by the modified vehicle model data 177 using the following digital data as inputs: (1) the simulation data; and the modified vehicle model data 177. The estimation data 175 is generated based on these one or more simulations. These simulations may be triggered by the request 185 for a report, or the estimation data 175 may be already generated prior to receiving the request 185 and subsequently retrieved from the memory 127 of the digital twin server 107 based on the receipt of the request 185.

As depicted in FIG. 1B, the vehicle model data 184 is digital data that describes the vehicle model for a particular make and model of a particular vehicle that is being monitored by the digital twin system 199. For example, the vehicle model data 184 is digital data that describes the hardware and software design of the particular vehicle.

The communication unit 145 of the digital twin server 107 receives the measured data 172 and the onboard data 156 from the network 105, which is not pictured in FIG. 1B. FIG. 1B depicts a single instance of measured data 172 and onboard data 156 being received by the digital twin system 199. However, in practice multiple instances of measured data 172 and onboard data 156 may be received, and the modified vehicle model data 177 updated after new instances of measured data 172 and onboard data 156 are received so that the modified vehicle model is updated to reflect the present state of the real-world vehicle 123. In this way the modified vehicle model data 177 describes the digital twin in a modified condition as described by the onboard data 156 and the measured data 172; this version of the digital twin is continuously updated as new measured data 172 and onboard data 156 are received. The flow of measured data 172 and onboard data 156 from the vehicle monitor 196 of the vehicle 123 to the digital twin system 199 provides a feedback loop so that the modified vehicle model data 177 is repeatedly updated to reflect the latest onboard data 156 and measured data 172 that describe the condition of the real-world vehicle 123.

Referring now to FIG. 1C, depicted is a block diagram illustrating a process flow 197 for a digital twin system 199 to provide a virtual test drive service according to some embodiments.

In some embodiments, FIG. 1C depicts how virtual test drive data 186 is generated for a particular vehicle. The virtual test drive data 187 is digital data that provides an end user with a virtual test drive of a particular vehicle 123 they are considering for purchase. The VIN number or some other unique identifier of the particular vehicle 123 is specified in an electronic message including a request 186 that is received by the communication unit 145 of the digital twin server 199. The request 186 is a request for a virtual test drive of the specific vehicle 123 whose VIN is provided in the request 186. The digital twin system 199 then retrieves the correct virtual test data 186 based on this VIN.

In some embodiments, the request 186 also includes global positioning data (GPS data) describing the end user's geographical location so that the end user can virtually test drive the digital twin of the particular vehicle 123 (as described by the modified vehicle model data 177) on streets that are familiar to the end user, and which the vehicle 123 would experience on a day-to-day basis if purchased by the end user. The communication unit 145 then transmits the virtual test drive data 187 to the end customer's electronic device (e.g., a game console or some other processor-based computing device) which is communicatively coupled to an electronic display and controller for operating the digital twin during the virtual test drive. The virtual test drive data 187 includes the digital twin of the particular vehicle 123 identified by the VIN as well as a virtual roadway environment for test driving the digital twin. The virtual roadway environment may optionally be configured based on the GPS data. The virtual roadway environment may be retrieved from sources such as high-definition maps of roadways which are used to enabled automated driving for vehicles such as the particular vehicle 123.

Figure 2:
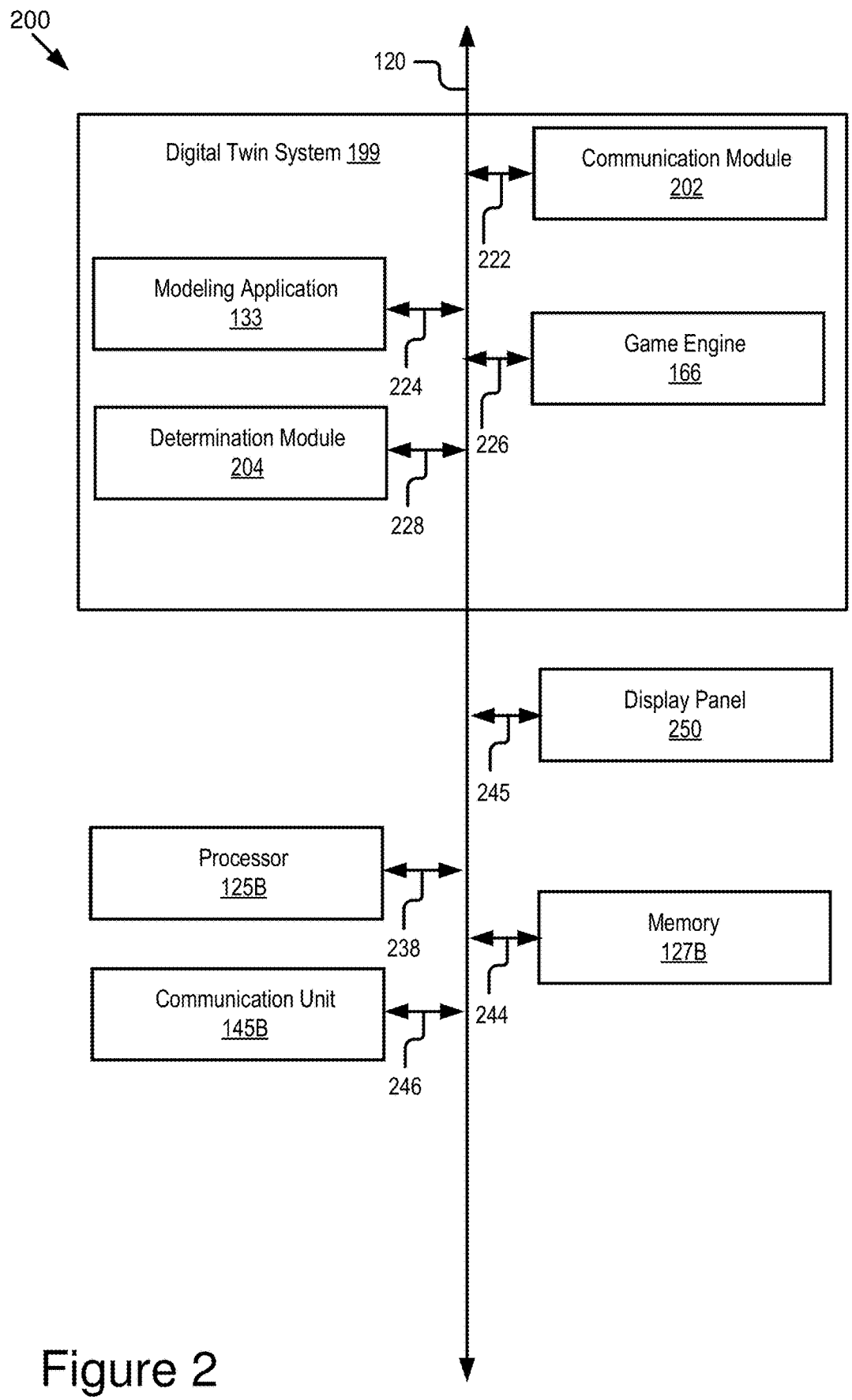
FIG. 2 is a block diagram illustrating an example computer system including the digital twin system according to some embodiments.

Referring now to FIG. 2, depicted is a block diagram illustrating an example computer system 200 including a digital twin system 199 according to some embodiments.

In some embodiments, the computer system 200 may include a special-purpose computer system that is programmed to perform one or more steps of a method 300 described below with reference to FIG. 3.

In some embodiments, the computer system 200 may be an element the digital twin server 107.

In some embodiments, the digital twin system 199 is an element of the vehicle 123. In some embodiments, the computer system 200 may be an onboard vehicle computer of the vehicle 123. In some embodiments, the computer system 200 may include an electronic control unit, head unit or some other processor-based computing device of the vehicle 123.

The computer system 200 may include one or more of the following elements according to some examples: the digital twin system 199; the processor 125; the communication unit 145; the memory 127; and a display panel 250. The components of the computer system 200 are communicatively coupled by a bus 120.

In the illustrated embodiment, the processor 125 is communicatively coupled to the bus 120 via a signal line 238. The communication unit 145 is communicatively coupled to the bus 120 via a signal line 246. The memory 127 is communicatively coupled to the bus 120 via a signal line 244. The display panel 250 is communicatively coupled to the bus 120 via a signal line 245.

The following elements of the computer system 200 were described above with reference to FIG. 1A, and so, those descriptions will not be repeated here: the processor 125; the communication unit 145; and the memory 127.

The display panel 250 is an electronic display panel that is operable to display graphical visualizations or other visual information. For example, the display panel is a monitor, a television, a touchscreen or some other electronic device that is operable to display visual information for viewing by a human user of the computer system 200.

The memory 127 may store any of the data described above with reference to FIGS. 1A-1C, or any other data described herein. The memory 127 may store any data necessary for the computer system 200 to provide its functionality.

In the illustrated embodiment shown in FIG. 2, the digital twin system 199 includes: a communication module 202; the modeling application 133; the game engine 166; and a determination module 204.

The communication module 202 can be software including routines for handling communications between the digital twin system 199 and other components of the computer system 200. In some embodiments, the communication module 202 can be a set of instructions executable by the processor 125 to provide the functionality described below for handling communications between the digital twin system 199 and other components of the computer system 200 or the operating environment 100.

The communication module 202 sends and receives data, via the communication unit 145, to and from one or more elements of the operating environment 100. The communication module 202 may send or receive any of the data or messages described above with reference to FIGS. 1A-1C or below with reference to FIGS. 3-6 via the communication unit 145.

In some embodiments, the communication module 202 receives data from components of the digital twin system 199 and stores the data in the memory 127. For example, the communication module 202: (1) receives the modified vehicle model data 177 and newly received onboard data 156; and (2) transmits the modified vehicle model data 177 and the newly received onboard data 156 to the modeling application so that the modified vehicle model data 177 may be updated based on newly received onboard data 156. The communication module 202 then stores the updated version of the modified vehicle model data 177 in the memory 127. In this way, the digital twin for a vehicle is continuously updated as new information about the vehicle is received by the digital twin system 199.

In some embodiments, the communication module 202 may handle communications between components of the digital twin system 199. For example, the communication module 202 may receive modified vehicle model data 177 from the modeling application 133 and transmit the modified vehicle model data 177 to the game engine 166. The communication module 202 may receive estimation data 175 from the game engine 166 and transmit the estimation data 175 to the determination module 204 so that the report data 173 may be generated based on the estimation data 175. The communication module 202 may receive report data 173 from the determination module 204 and transmit the report data 173 to the communication unit 145 with instructions for the communication unit 145 to transmit the report data 173 to the network 105.

In some embodiments, the communication module 202 can be stored in the memory 127 of the computer system 200 and can be accessible and executable by the processor 125. The communication module 202 is adapted for cooperation and communication with the processor 125 and other components of the computer system 200 via signal line 222.

The modeling application 133 was described above with reference to FIG. 1A, and so, that description will not be repeated here.

In some embodiments, the modeling application 133 can be stored in the memory 127 of the computer system 200 and can be accessible and executable by the processor 125. The modeling application 133 is adapted for cooperation and communication with the processor 125 and other components of the computer system 200 via signal line 224.

The game engine 166 was described above with reference to FIG. 1A, and so, that description will not be repeated here.

In some embodiments, the game engine 166 can be stored in the memory 127 of the computer system 200 and can be accessible and executable by the processor 125. The game engine 166 is adapted for cooperation and communication with the processor 125 and other components of the computer system 200 via signal line 226.

The determination module 204 includes code and routines that are operable, when executed by the processor 125, to cause the processor 125 to receive the estimation data 175 from the game engine 166 and generate the report data 173 and based on the estimation data 175. In some embodiments, the determination module 204 includes code and routines that are operable, when executed by the processor 125, to cause the processor 125 to receive the request 186 (and any data included in the request 186) and the modified vehicle model data 177 and generate the virtual test drive data 187 that is responsive to the request 186.

In some embodiments, the determination module 204 of the computer system 200 determines a certification for a vehicle 123 based on the estimation data 175 relative to the remaining service life of the vehicle components of the vehicle 123 as indicated by the design information for this particular make and model of vehicle 123 as described by the vehicle model data 184. For example, if the remaining service life for enough vehicle components, or vehicle components designated as critical, meet or exceed some threshold, then the electronic report includes a certification for the vehicle 123 which is determined based on the performance of the digital twin in the one or more simulations executed by the digital twin system 199 using the modified vehicle model data 177.

In some embodiments, the determination module 204 can be stored in the memory 127 of the computer system 200 and can be accessible and executable by the processor 125. The determination module 204 is adapted for cooperation and communication with the processor 125 and other components of the computer system 200 via signal line 228.

Figure 3:
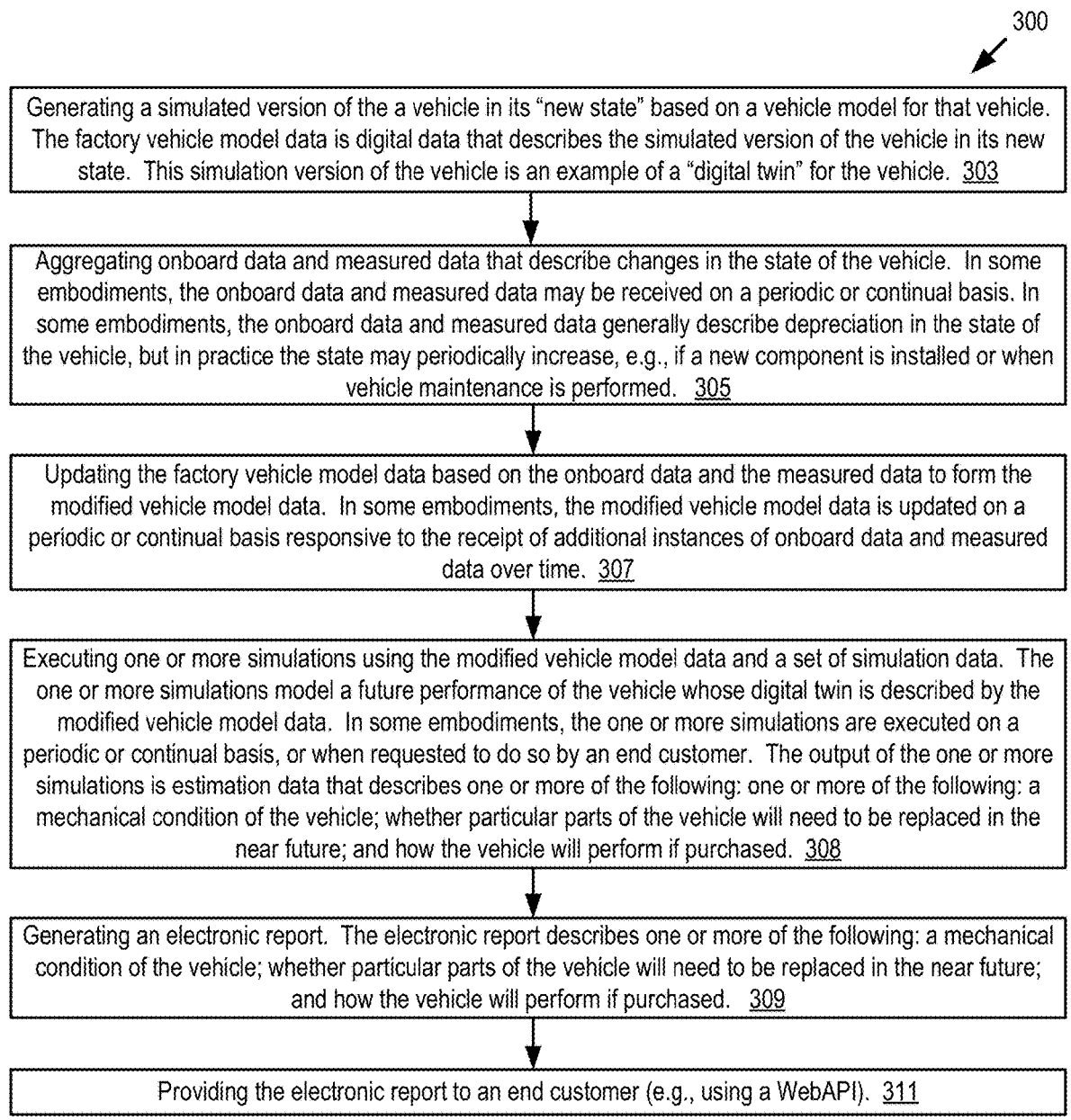
FIG. 3 includes a flowchart of an example method for providing a digital twin service for a real-world vehicle according to some embodiments.

Referring now to FIG. 3, depicted is a flowchart of an example method 300 for providing a digital twin service for a real-world vehicle according to some embodiments. The digital twin service includes one or more steps of the method 300. One or more of the steps described herein for the method 300 may be executed by one or more computer systems 200.

At step 303, a simulated version of a vehicle in its "new state" is generated based on a vehicle model for that vehicle. The "new state" may include the vehicle as it was manufactured based on the vehicle model for this particular make and model of vehicle. The factory vehicle model data is digital data that describes the simulated version of the vehicle in its new state. This simulation version of the vehicle is an example of a digital twin for the vehicle.

At step 305, onboard data and measured data that describe changes in the state of the vehicle are aggregated. In some embodiments, the onboard data and measured data may be received on a periodic- or continual basis. In some embodiments, the onboard data and measured data generally describe depreciation in the state of the vehicle, but in practice the state may periodically increase, e.g., if a new component is installed or when vehicle maintenance is performed.

At step 307, the factory vehicle model data is updated based on the onboard data and the measured data to form the modified vehicle model data. In some embodiments, the modified vehicle model data is updated on a periodic or continual basis responsive to the receipt of additional instances of onboard data and measured data over time.

At step 308, one or more simulations are executed using the modified vehicle model data and a set of simulation data. The one or more simulations model a future performance of the vehicle whose digital twin is described by the modified vehicle model data. In some embodiments, the one or more simulations are executed on a periodic or continual basis, or when requested to do so by an end customer. The output of the one or more simulations is estimation data that describes one or more of the following: one or more of the following: a mechanical condition of the vehicle; whether particular parts of the vehicle will need to be replaced in the near future; and how the vehicle will perform if purchased. In some embodiments, the estimation data is generated based in part on information included in the vehicle model data for this particular vehicle, including, for example, information about the components included in the vehicle and the expected service life for each of these components, and mechanical indications that the components need to be replace or may need to be replaced in the future.

At step 309, an electronic report is generated. The electronic report describes one or more of the following: a mechanical condition of the vehicle; whether particular parts of the vehicle will need to be replaced in the near future; and how the vehicle will perform if purchased. The electronic report is generated based on the estimation data.

At step 311, the electronic report is provided to an end customer (e.g., using a WebAPI).

Figure 4:
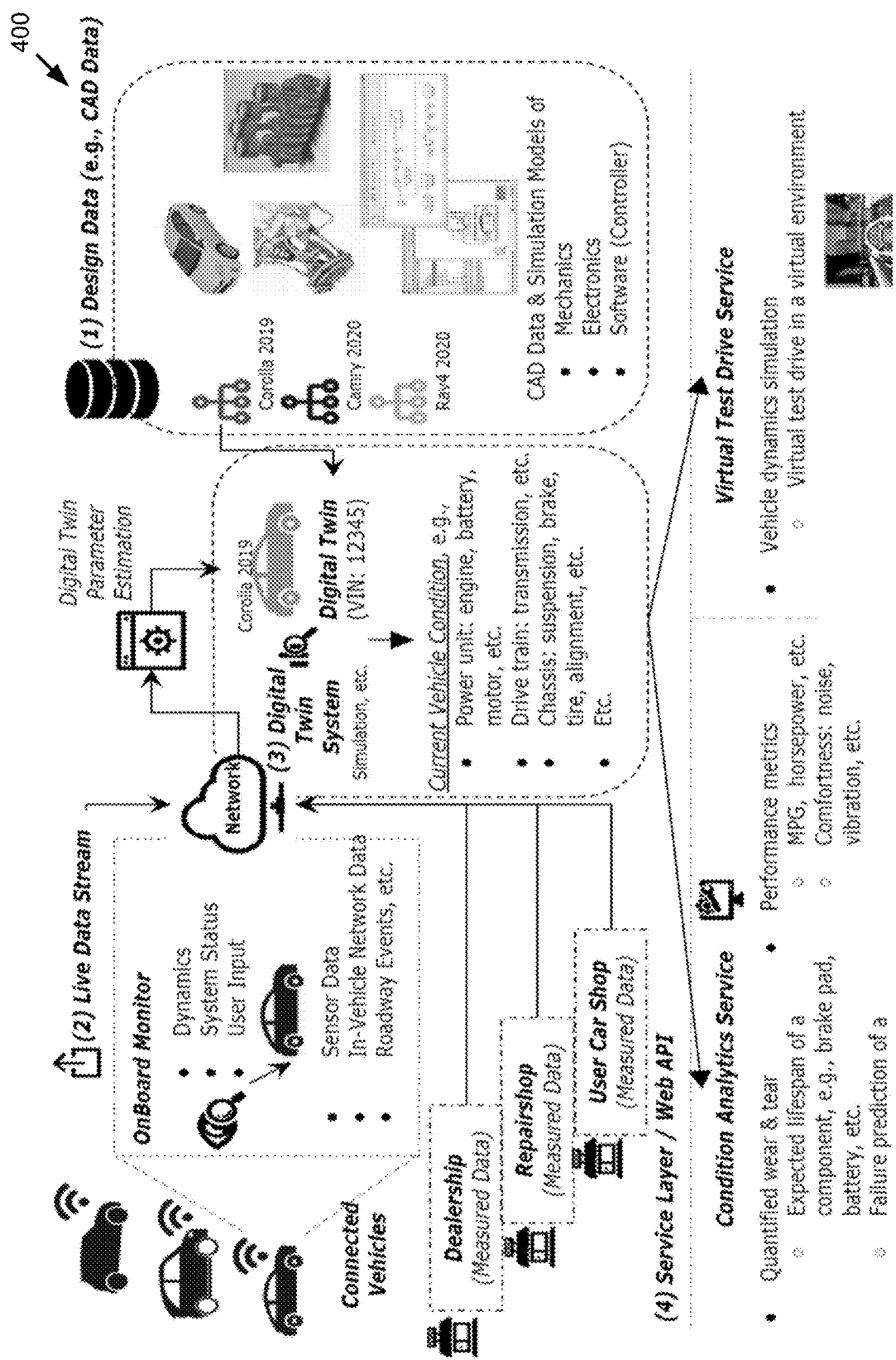
FIG. 4 is a block diagram illustrating an overview of the digital system according to some embodiments.

Referring to FIG. 4, depicted is a block diagram illustrating an overview 400 of the digital system according to some embodiments.

Figure 5:
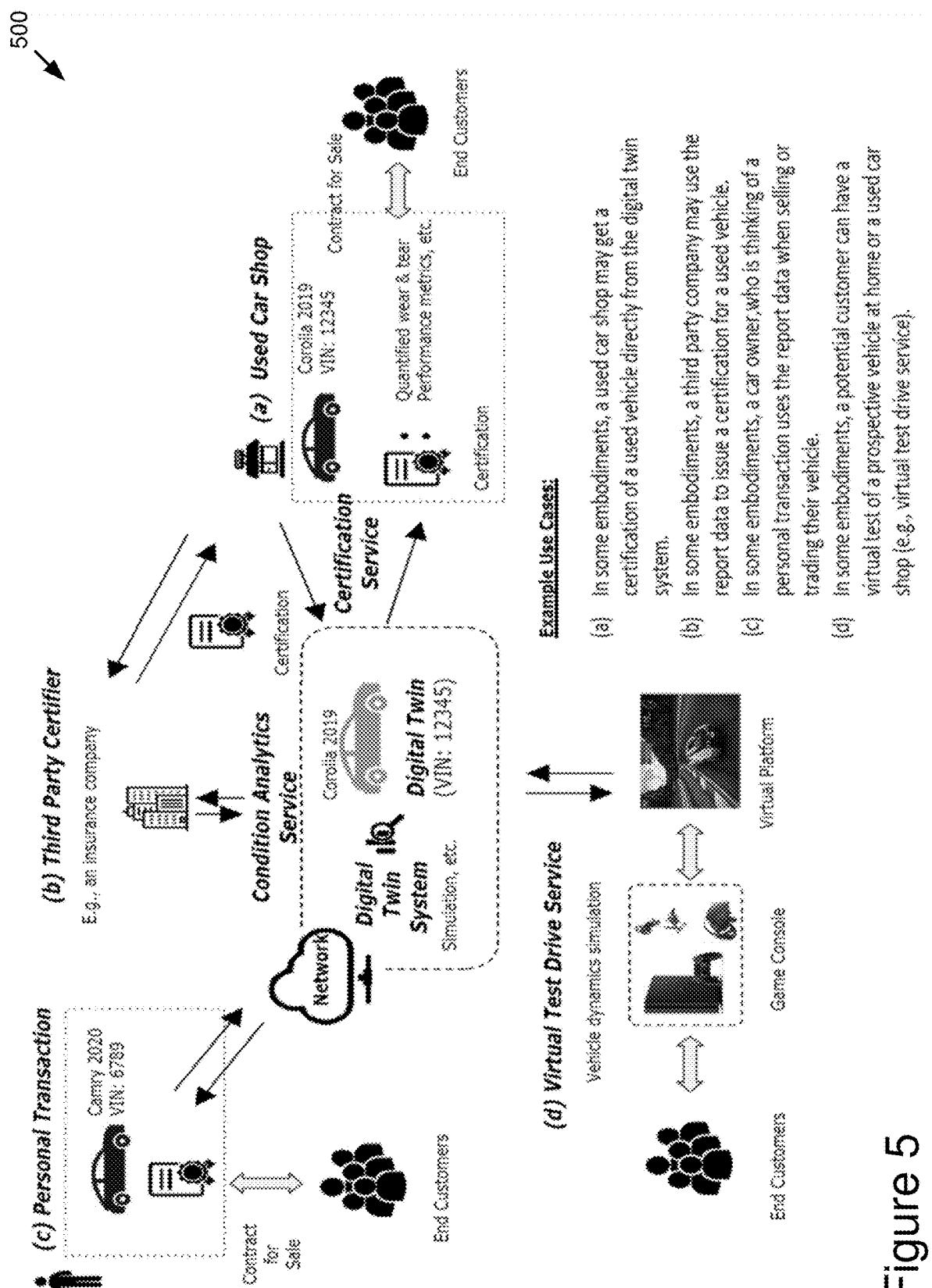
FIG. 5 is a block diagram illustrating an overview of an alternative operating environment for the digital twin system and how the digital twin system fits into the used vehicle market according to some embodiments.

Referring to FIG. 5, depicted is a block diagram illustrating an overview 500 of an alternative operating environment for the digital twin system and how the digital twin system fits into the used vehicle market according to some embodiments.

Figure 6:
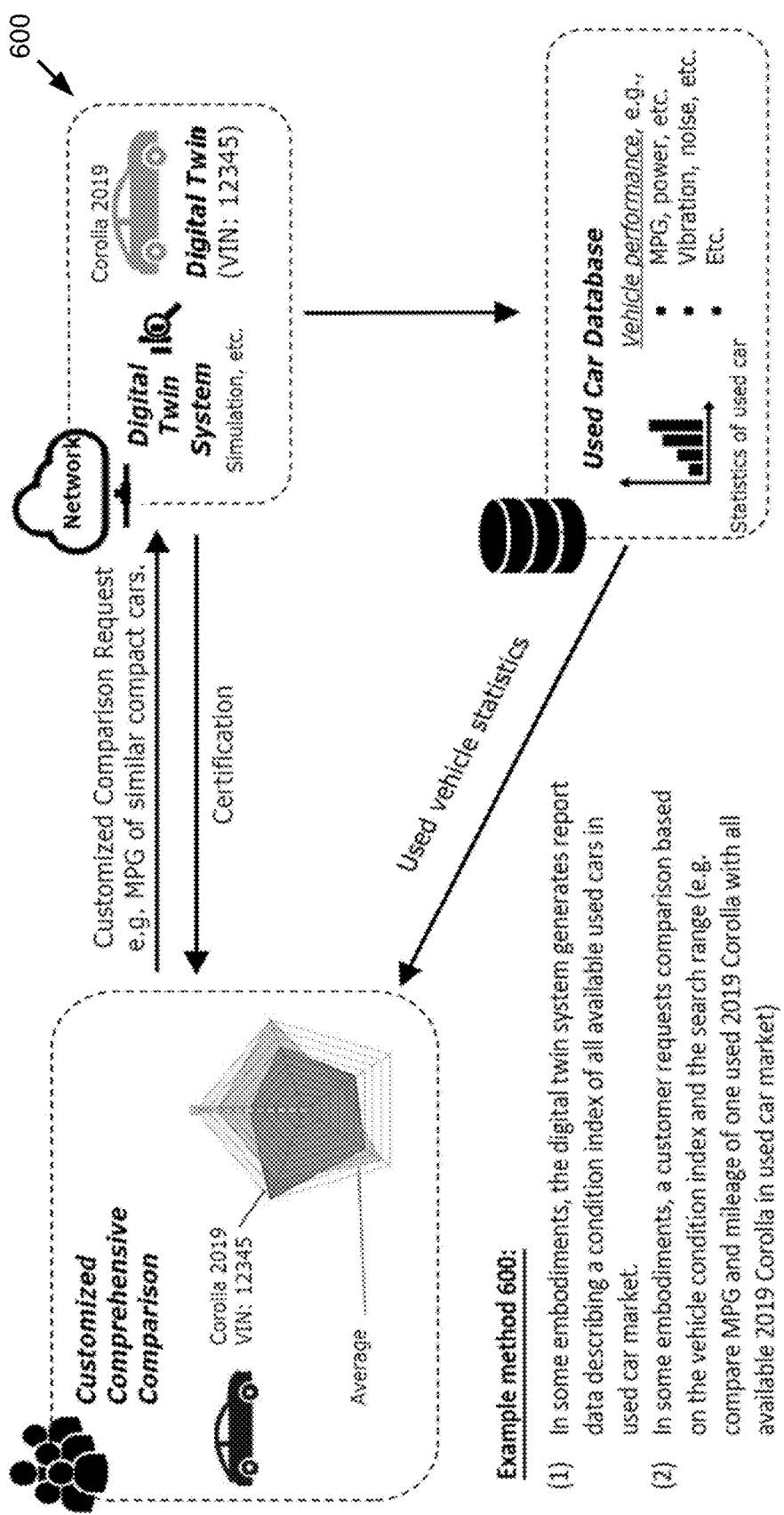
FIG. 6 is a block diagram illustrating a process flow for providing certification of used vehicles using the digital twin system according to some embodiments.

Referring to FIG. 6, depicted is a block diagram illustrating a process flow 600 for providing certification of used vehicles using the digital twin system according to some embodiments. In some embodiments, the determination module 204 of the computer system 200 determines the certification based on the estimation data 175 relative to the remaining service life of the vehicle components of the vehicle 123 as indicated by the design information for this particular make and model of vehicle 123 as described by the vehicle model data 184. For example, if the remaining service life for enough vehicle components, or vehicle components designated as critical, meet or exceed some threshold, then the electronic report includes a certification for the vehicle 123 which is determined based on the performance of the digital twin in the one or more simulations executed by the digital twin system 199 using the modified vehicle model data 177.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    generating a factory vehicle model of a vehicle that describes a first digital representation of the vehicle as it existed in a real-world;
    receiving digital data recorded by a sensor and describing an altered condition of the vehicle as it exists in the real-world;
    generating, based on the factory vehicle model and the digital data, a modified vehicle model of the vehicle that describes a second digital representation of the vehicle in the altered condition;
    retrieving simulation data that describes one or more virtual roadway environments and one or more static objects and dynamic objects included in the one or more virtual roadway environment;
    executing a plurality of simulations each including, based on the modified vehicle model and the simulation data, a digital twin of the vehicle in the altered condition operating in the one or more virtual roadway environments and the one or more static objects and dynamic objects included in the one or more virtual roadway environments;
    causing, based on the execution the plurality of simulations, the one or more static objects and dynamic objects to behave as real-world objects in relation to the digital twin of the vehicle operating in the one or more virtual roadway environments of the plurality of simulations; and
    generating an electronic report describing the vehicle based on the plurality of executed simulations and the digital twin, wherein the electronic report includes a prediction based on the plurality of simulations.

2. The method of claim 1, wherein the factory vehicle model is based on vehicle model data that is associated with a vehicle identification number for the vehicle, wherein the vehicle model data describes a hardware design and a software design of the vehicle.

3. The method of claim 1, wherein the digital data describes a state of one or more vehicle components of the vehicle that are selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component.

4. The method of claim 1, further comprising providing a virtual test drive based on virtual test drive data customized for a user that requests the virtual test drive wherein providing the virtual test drive includes providing the user with an option to select a geographic setting for the virtual test drive.

5. The method of claim 1 further comprising generating a certification of a future performance of the vehicle based on the prediction.

6. The method of claim 1, wherein the vehicle is an autonomous vehicle.

7. The method of claim 1 further comprising updating the modified vehicle model in real-time based on a feedback loop.

8. The method of claim 1, wherein the factory vehicle model uses design data that describes a model of the vehicle.

9. A system comprising:
a non-transitory memory storing digital data recorded by a sensor and describing a vehicle as it exists in a real-world; and
a processor that is communicatively coupled to the non-transitory memory, wherein the non-transitory memory stores computer code which, when executed by the processor, causes the processor to:
generate a factory vehicle model of a vehicle that describes a first digital representation of the vehicle as it existed in a real-world;
receive digital data recorded by a sensor and describing an altered condition of the vehicle as it exists in the real-world;
generate, based on the factory vehicle model and the digital data, a modified vehicle model of the vehicle that describes a second digital representation of the vehicle in the altered condition;
retrieve simulation data that describes one or more virtual roadway environments and one or more static objects and dynamic objects included in the one or more virtual roadway environment;
execute a plurality of simulations each including, based on the modified vehicle model and the simulation data, a digital twin of the vehicle in the altered condition operating in the one or more virtual roadway environments and the one or more static objects and dynamic objects included in the one or more virtual roadway environments;
cause, based on the execution the plurality of simulations, the one or more static objects and dynamic objects to behave as real-world objects in relation to the digital twin of the vehicle operating in the one or more virtual roadway environments of the plurality of simulations; and
generate an electronic report describing the vehicle based on the plurality of executed simulations and the digital twin, wherein the electronic report includes a prediction based on the plurality of simulations.

10. The system of claim 9, wherein the factory vehicle model is based on a vehicle identification number for the vehicle.

11. The system of claim 9, wherein the digital data describes a state of one or more vehicle components of the vehicle that are selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component.

12. The system of claim 9, wherein the sensor is an element of the vehicle.

13. The system of claim 9, wherein the electronic report includes a certification based on the prediction.

14. The system of claim 9, wherein the vehicle is a Highly Autonomous Vehicle.

15. The system of claim 9 further comprising updating the modified vehicle model in real-time based on a feedback loop.

16. A computer program product comprising a non-transitory memory storing computer-executable code that, when executed by a processor, causes the processor to:
generate a factory vehicle model of a vehicle that describes a first digital representation of the vehicle as it existed in a real-world;
receive digital data recorded by a sensor and describing an altered condition of the vehicle as it exists in the real-world;
generate, based on the factory vehicle model and the digital data, a modified vehicle model of the vehicle that describes a second digital representation of the vehicle in the altered condition;
retrieve simulation data that describes one or more virtual roadway environments and one or more static objects and dynamic objects included in the one or more virtual roadway environment;
execute a plurality of simulations each including, based on the modified vehicle model and the simulation data, a digital twin of the vehicle in the altered condition operating in the one or more virtual roadway environments and the one or more static objects and dynamic objects included in the one or more virtual roadway environments;
cause, based on the execution the plurality of simulations, the one or more static objects and dynamic objects to behave as real-world objects in relation to the digital twin of the vehicle operating in the one or more virtual roadway environments of the plurality of simulations; and
generate an electronic report describing the vehicle based on the plurality of executed simulations and the digital twin, wherein the electronic report includes a prediction based on the plurality of simulations.

17. The computer program product of claim 16, wherein the factory vehicle model is based on a vehicle identification number for the vehicle.

18. The computer program product of claim 16, wherein the digital data describes a state of one or more vehicle components of the vehicle that are selected from a group that consists of: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; and a powertrain component.

19. The computer program product of claim 16, wherein the sensor is an element of a different vehicle.

20. The computer program product of claim 16, wherein the electronic report includes a certification based on the prediction.

* * * * *